United States Patent
Vizitiu et al.

(10) Patent No.: US 12,471,866 B2
(45) Date of Patent: Nov. 18, 2025

(54) DYNAMIC VESSEL ROADMAPPING

(71) Applicant: SIEMENS HEALTHINEERS AG, Forchheim (DE)

(72) Inventors: Anamaria Vizitiu, Covasna (RO); Venkatesh Narasimha Murthy, Hillsborough, NJ (US); Klaus Kirchberg, Plainsboro, NJ (US); Walid Bekhtaoui, Lawrenceville, NJ (US); Rui Liao, Princeton Junction, NJ (US)

(73) Assignee: Siemens Healthineers AG, Forchheim (DE)

( * ) Notice: Subject to any disclaimer, the term of this patent is extended or adjusted under 35 U.S.C. 154(b) by 282 days.

(21) Appl. No.: 18/310,125

(22) Filed: May 1, 2023

(65) Prior Publication Data

US 2023/0380787 A1 Nov. 30, 2023

(30) Foreign Application Priority Data

May 24, 2022 (EP) .................................. 22175147

(51) Int. Cl.
*A61B 6/50* (2024.01)
*A61B 6/00* (2024.01)
*G06T 7/00* (2017.01)

(52) U.S. Cl.
CPC .............. *A61B 6/504* (2013.01); *A61B 6/481* (2013.01); *A61B 6/485* (2013.01); *G06T 7/0012* (2013.01); *G06T 2207/30101* (2013.01)

(58) Field of Classification Search
CPC ......... A61B 6/485; A61B 6/481; A61B 6/504; A61B 6/5211; A61B 6/461; A61B 6/5294; A61B 6/469; A61B 6/5235; A61B 6/487; A61B 6/5241; A61B 5/0245; A61B 6/032; A61B 6/5217; A61B 6/5229; A61B 6/5264; A61B 6/5288; A61B 5/349; A61B 6/463; A61B 5/0044; A61B 6/503; A61B 6/464;

(Continued)

(56) References Cited

U.S. PATENT DOCUMENTS

2012/0238871 A1* 9/2012 Pfister ...................... A61B 6/12
600/431
2020/0222018 A1 7/2020 van Walsum et al.

OTHER PUBLICATIONS

Chon et al., "Radiation reduction during percutaneous coronary intervention", Medicine, 2017, pp. 1-4.

(Continued)

*Primary Examiner* — Irakli Kiknadze

(57) ABSTRACT

The present application relates to a computer-implemented dynamic vessel roadmapping method. The method comprises generating a vessel roadmap library, the vessel roadmap library including a plurality of vessel roadmaps, wherein each vessel roadmap comprises vessel roadmap image and first and second alignment data, obtaining a real-time fluoroscopy image and corresponding real-time first and second fluoroscopy information, overlaying a vessel roadmap image of the vessel roadmap library with the real-time fluoroscopy image based on the first alignment data, the second alignment data, and the real time first and second fluoroscopy information and aligning the vessel roadmap image and the real-time fluoroscopy image based on the second alignment data and the real time second fluoroscopy information, wherein the second alignment data is derived from the corresponding vessel roadmap image.

20 Claims, 11 Drawing Sheets

(58) Field of Classification Search
CPC ....... A61B 6/5247; A61B 6/5205; A61B 6/12; A61B 6/03; A61B 6/4441; A61B 8/483; A61B 8/0891; A61B 6/547; A61B 6/484; A61B 34/20; A61B 2034/2065; A61B 2090/376; A61B 6/486; A61B 34/30; A61B 6/44; A61B 5/33; A61B 5/346; A61B 5/352; A61B 5/366; A61B 5/08; A61B 2034/2055; G06T 11/008; G06T 7/33; G06T 7/0012; G06T 2207/10121; G06T 2211/404; G06T 2207/30101; G06T 7/0016; G06T 2207/20084; G06T 7/20; G06T 7/74; G06T 7/0014; G06T 2207/20081; G06T 2207/30048; G06T 2207/30021; G06T 2207/20076; G06T 7/246; G06T 7/73; G06T 7/277; G06T 7/248; G06T 2207/10016; G06T 2207/10116; G06T 2207/20132; G06T 5/50; G06T 2207/20221; G16H 50/50; G16H 30/20; G16H 50/20; G16H 30/40; A61M 2025/0166
USPC .......................................................... 378/98
See application file for complete search history.

(56) References Cited

OTHER PUBLICATIONS

Piayda et al., "Dynamic coronary roadmapping during percutaneous coronary intervention: a feasibility study", European Journal of Medical Research, 2018, pp. 1-7.

Ma et al., "Dynamic Coronary Roadmapping via Catheter Tip Tracking in X-ray Fluoroscopy with Deep Learning Based Bayesian Filtering", arXivv:2001.03801, 2020, pp. 1-29.

Christov, "Real time electrocardiogram QRS detection using combined adaptive threshold", BioMedical Engineering OnLine, 2004, pp. 1-9.

Huang et al., "Densely Connected Convolutional Networks", arXiv:1608.06993, 2018, pp. 1-9.

Shechter et al., "Respiratory motion of the heart from free breathing coronary angiograms", IEEE Transactions on Medical Imaging , 2004, pp. 1-27.

Baka et al., "Respiratory motion estimation in x-ray angiography for improved guidance during coronary interventions", Physics in Medicine & Biology, 2015, pp. 3617-3637.

Vy et al., "Patient-specific simulation of guidewire deformation during transcatheter aortic valve implantation", International Journal for Numerical Methods in Biomedical Engineering, 2018, pp. 1-18.

Sarkar et al., "Extraction of respiration signal from ECG for respiratory rate estimation", IET International Summit, 2015, pp. 336-340.

Varon et al., "A Comparative Study of ECG-derived Respiration in Ambulatory Monitoring using the Single-lead ECG", Scientific Reports, 2020, 14 pgs.

Schrumpf et al., "Derivation of the respiratory rate from directly and indirectly measured respiratory signals using autocorrelation", Current Directions in Biomedical Engineering, 2015, pp. 1-4.

Lazaro et al., "Electrocardiogram derived respiratory rate from QRS slopes and R-wave angle", Annals of Biomedical Engineering, 2014, pp. 2072-2083.

European Patent Application No. 22197534.5, "Method and System for Vascular Catheter Tip Detection in Medical Images", filed Sep. 23, 2022, 64 pgs.

Extended European Search Report mailed Nov. 22, 2022 received in connection with European Patent Application No. 22175147.2, filed May 24, 2022, 7 pgs.

* cited by examiner

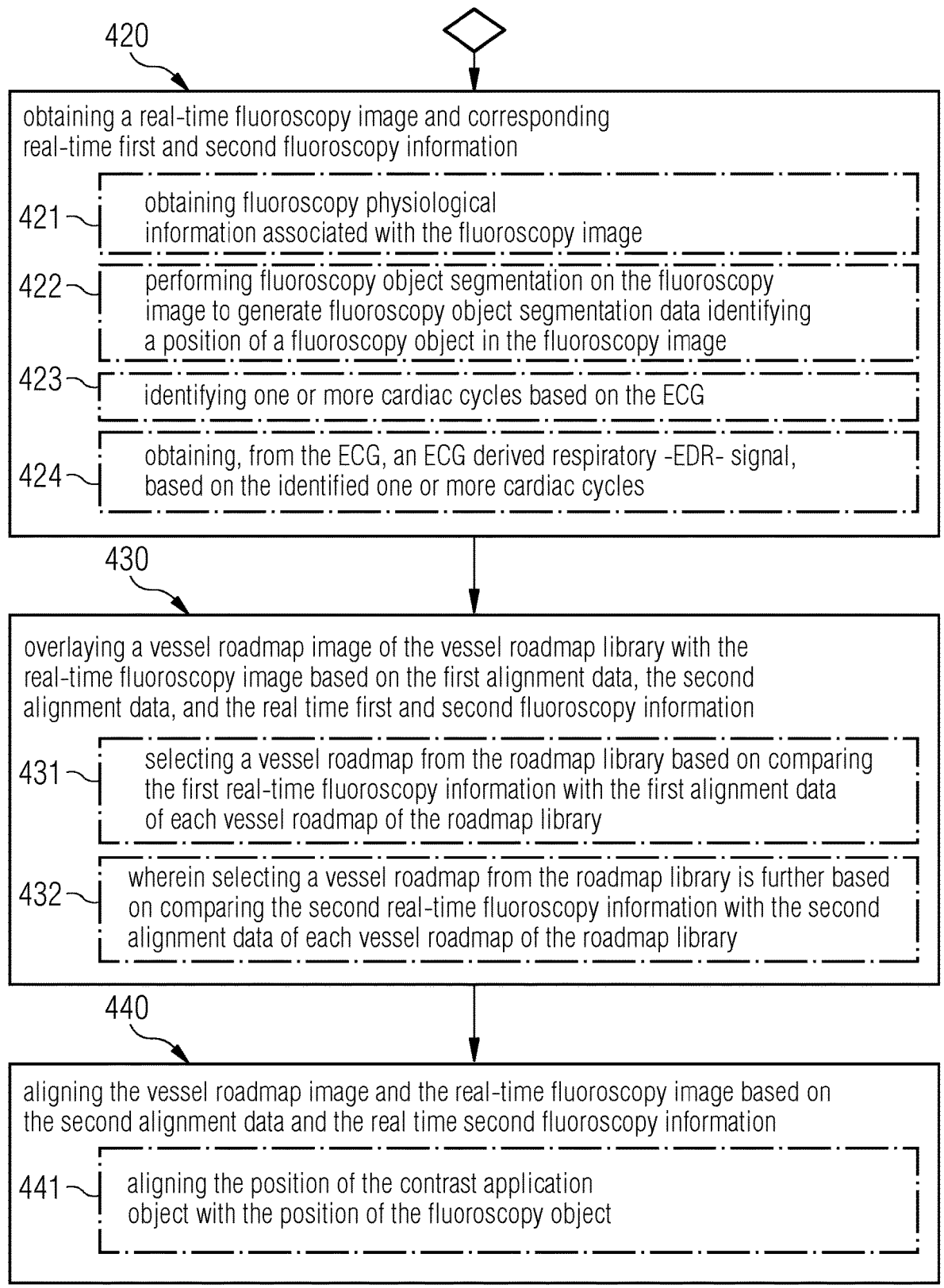

370

380

DYNAMIC VESSEL ROADMAPPING

CROSS-REFERENCE TO RELATED APPLICATIONS

This application claims the benefit of priority under 35 U.S.C. § 119 to European Patent Application No. 22175147.2, filed May 24, 2022, the disclosure of which is incorporated herein by reference in its entirety.

TECHNICAL FIELD

The invention generally relates to dynamic vessel roadmapping. More precisely, the invention relates to using vessel images obtained using a medical imaging method as dynamic vessel roadmaps (DRMs) in real-time during a subsequent fluoroscopy-based medical intervention.

BACKGROUND

During fluoroscopy-based medical interventions, such as a percutaneous coronary intervention, an overview of a vessel tree may be obtained by injecting contrast medium. However, depending on the duration of the intervention, the amount of contrast medium injected into a patient may be detrimental to the renal function of the patient. Further, the need to obtain an overview of the vessel tree during the medical intervention may extend the time a patient is subjected to fluoroscopy and thereby to radiation. Medical interventions are typically preceded by the performance of a medical imaging method, such as angiography, in order to determine the need for the intervention. Therefore, it would be beneficial if the vessel images obtained during the medical imaging method could be used during the medical intervention in order to reduce the amount of contrast medium as well as the exposure to radiation. Yet, laying the vessel images obtained during a preceding medical imaging method over the real-time fluoroscopy image during the medical intervention leads to a misalignment between the overlaid vessel tree and the actual position of the vessel tree shown in the real-time fluoroscopy image. This misalignment occurs since the vessel tree typically moves, e.g. due to the heartbeat or the breathing of the patient. Accordingly, in order to be able to properly use the vessel tree images obtained during a preceding medical imaging method, it would be necessary to enable proper alignment of the vessel tree images and the real-time fluoroscopy image.

Therefore, it is an objective of the present invention to enable proper alignment of vessel tree images and a real-time fluoroscopy image.

SUMMARY OF THE INVENTION

To achieve this object, the present invention provides a computer-implemented dynamic vessel roadmapping method, comprising the steps of: generating a vessel roadmap library, the vessel roadmap library including a plurality of vessel roadmaps, wherein each vessel roadmap comprises a vessel roadmap image and first and second alignment data; obtaining a real-time fluoroscopy image and corresponding real-time first and second fluoroscopy information; overlaying a vessel roadmap image of the vessel roadmap library with the real-time fluoroscopy image based on the first alignment data, the second alignment data, and the real time first and second fluoroscopy information; and aligning the vessel roadmap image and the real-time fluoroscopy image based on the second alignment data and the real time second fluoroscopy information, wherein the second alignment data is derived from the corresponding vessel image.

Further, the present invention provides a computer-readable medium comprising instructions configured to be executed by a computer including at least one processor, the instructions causing the processor to perform the steps of generating a vessel roadmap library, the vessel roadmap library including a plurality of vessel roadmaps, wherein each vessel roadmap comprises a vessel roadmap image and first and second alignment data; obtaining a real-time fluoroscopy image and corresponding real-time first and second fluoroscopy information; overlaying a vessel roadmap image of the vessel roadmap library with the real-time fluoroscopy image based on the first alignment data, the second alignment data, and the real time first and second fluoroscopy information; and aligning the vessel roadmap image and the real-time fluoroscopy image based on the second alignment data and the real time second fluoroscopy information, wherein the second alignment data is derived from the corresponding vessel image.

BRIEF DESCRIPTION OF THE DRAWINGS

Embodiments of the present invention will be described with reference to the following appended drawings, in which like reference signs refer to like elements.

FIGS. 2A and 2B illustrate a DRM method according to embodiments of the invention.

It should be understood that these drawings are in no way meant to limit the disclosure of the present invention. Rather, these drawings are provided to assist in understanding the invention. The person skilled in the art will readily understand that aspects of the present invention shown in one drawing may be combined with aspects in another drawing or may be omitted without departing from the scope of the present invention.

DETAILED DESCRIPTION

The present disclosure generally provides a dynamic vessel roadmapping (DRM) method. A vessel roadmap library including vessel roadmaps as well as alignment data are generated. During subsequent real-time fluoroscopy, a fluoroscopy image and corresponding real-time first and second fluoroscopy information is obtained. By comparing the alignment data of the vessel roadmap library and the real-time fluoroscopy information, one of the vessel roadmaps included in the vessel roadmap library is then selected to be laid over the real-time fluoroscopy image. The alignment data is further used to align the overlaid vessel roadmap with the real-time fluoroscopy image, e.g. by shifting or rotating the roadmap to achieve an improved alignment.

This general concept of the DRM method will now be discussed in detail with reference to the drawings.

Figure 1:
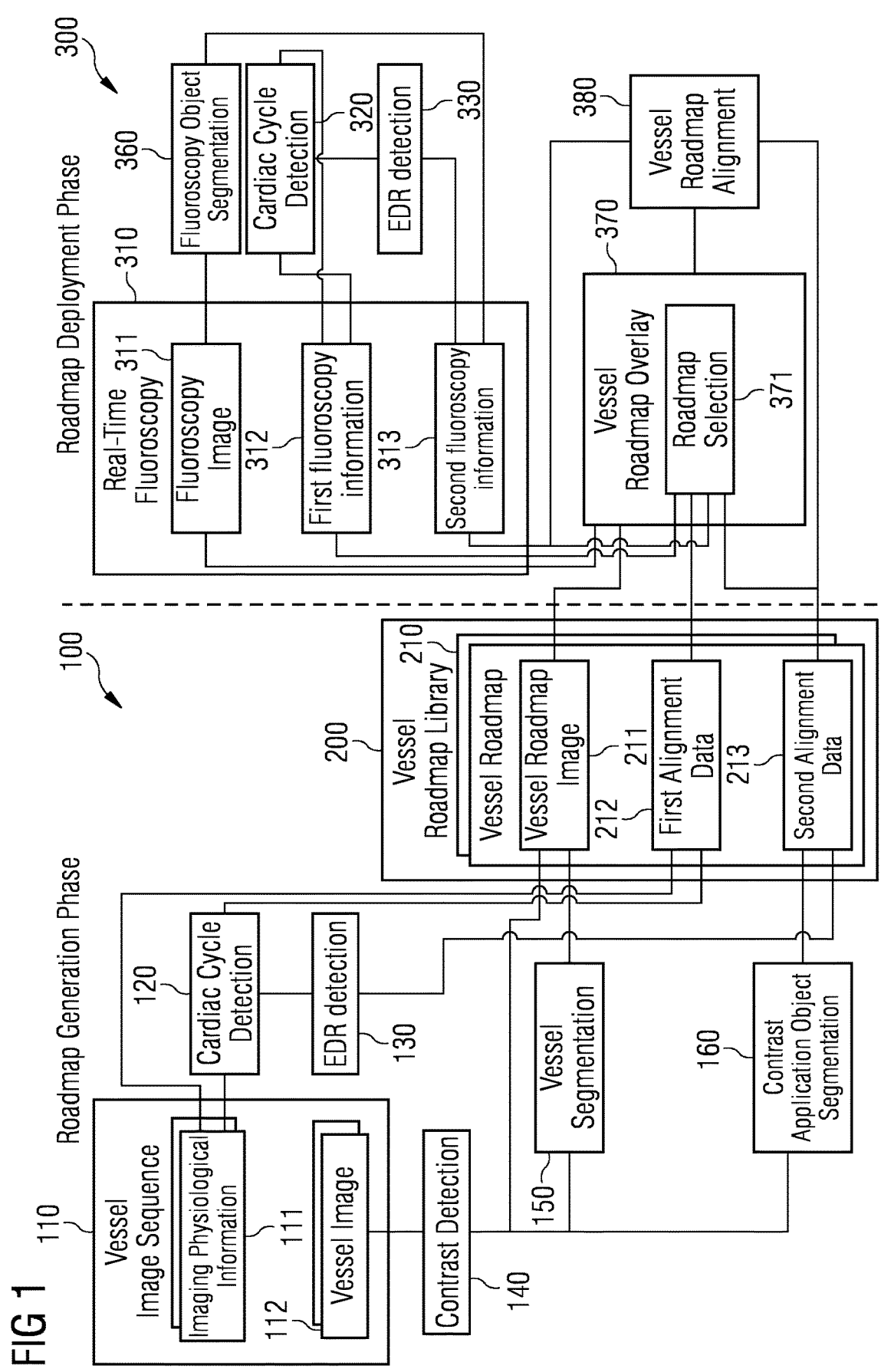
FIG. 1 shows a schematic diagram of a DRM workflow according to embodiments of the invention.

FIG. 1 shows a schematic diagram of a DRM workflow according to embodiments of the invention. The lines shown in FIG. 1 indicate where various data, such as vessel image 112 or the output of vessel segmentation 150, is provided to. The blocks shown in FIG. 1 indicate both processing entities, such as cardiac cycle detection 120, and stored data elements, such as vessel roadmap 211.

The workflow is separated into two phases, i.e. a roadmap generation phase 100 and a roadmap deployment phase 300. During roadmap generation phase 100, a vessel image sequence 110 is processed to generate a vessel roadmap library 200. Vessel roadmap library 200 is then deployed in roadmap deployment phase 300 to provide a dynamic vessel roadmap during fluoroscopy. First, roadmap generation phase 100 will be described.

Vessel image sequence 110 may include a plurality of vessel images 112. Vessel images 112 are images of vessels or a vessel tree, such as the coronary arteries, the iliac veins or the lumbar lymph trunk. Generally, in the context of the present application, vessels may therefore refer to arteries, veins or lymphatic vessels. Vessel images 112 and more generally vessel image sequence 110 may be obtained using any medical imaging method capable of rendering vessels visible, such as angiography. In particular, medical imaging methods used to obtain vessel image sequence 110 may be based on injecting a radio-opaque contrast medium into vessels via a contrast application object and rendering the radio-opaque contrast medium visible via e.g. an x-ray. In some embodiments, vessel images 112 may be stored as or may be Digital Imaging and Communications in Medicine (DICOM) images.

Vessel image sequence 110 may include imaging physiological information 111. Imaging physiological information 111 may be any physiological information of a patient recorded while the imaging method used to obtain vessel images 112 is performed and which may be used to later overlay and align vessel roadmaps with a real-time fluoroscopy image. In particular, imaging physiological information 111 may be recorded at approximately the same point in time as the corresponding vessel image 112. In some embodiments, imaging physiological information 111 may include or may be an electrocardiogram (ECG) recorded while the imaging method used to obtain vessel images 112 is performed. In some embodiments, imaging physiological information may be stored as or may be a DICOM data tag included in the DICOM image file of the corresponding vessel image 112. Imaging physiological information 111 may be included in, e.g. stored as part of, first alignment data 212 of a vessel roadmap 210.

The vessel images may be processed by contrast detection 140 to detect contrasted vessel images among the plurality of vessel images 112. Contrast detection 140 may detect contrasted vessel images by detecting the presence of contrast medium in vessel images 112. Contrast detection 140 may in some embodiments analyze the pixels of each vessel image 112 to detect, based on a property of the pixels, the presence of contrast medium in the respective vessel image 112. The property of the pixels may e.g. a brightness value or a color value. In some embodiments, a vessel image 112 may be identified as a contrasted vessel image if a single pixel indicative of contrast medium is identified. In some embodiments, a vessel image 112 may be identified as a contrasted vessel image if a number of pixels indicative of contrast medium which exceeds a contrast medium detection threshold is identified. In some embodiments, contrast detection 140 may detect contrasted vessel images among the plurality of vessel images using a deep learning model, such as DeepNet, which identifies contrast medium in the vessel images 112 and provides a frame-by-frame classification of the vessel image sequence 110. The contrasted vessel images detected by contrast detection 140 are then provided to vessel segmentation 150 and contrast application segmentation 160. Furthermore, each contrasted vessel image may be included in, e.g. stored as part of, a vessel roadmap image 211 of vessel roadmap 210.

Vessel segmentation 150 may perform vessel segmentation on the contrasted vessel images to generate vessel segmentation data. Accordingly, vessel segmentation 150 may generate data indicative of the position and/or the course of the vessels within the contrasted vessel images. Vessel segmentation data may be generated by vessel generation 150 based on a variety of image segmentation approaches, such as based on convolutional neural networks (CNN), e.g. U-Net, densely connected neural networks, deep-learning methods, graph-partitioning methods, e.g. Markoff random fields (MRF), or region-growing methods, e.g. split-and-merge segmentation. The vessel segmentation data may then be included in, e.g. stored as part of, a vessel roadmap image 211 of a vessel roadmap 210.

It should be noted that, while vessel segmentation is shown in FIG. 1 as processing contrasted vessel images, vessel segmentation may also directly process vessel images 112 to generate vessel segmentation data prior to detecting contrasted vessel images. In some embodiments, vessel segmentation 150 may also be incorporated into or be part of contrast detection 140. In such embodiments, detecting pixels indicative of contrast mediums may at the same time be used to generate vessel segmentation data.

Contrast application object segmentation 160 may perform contrast application object segmentation on the contrasted vessel images to generate contrast application object segmentation data. Accordingly, contrast application object segmentation data may identify a position and/or the course of the contrast application object in the contrasted vessel images. More precisely, the contrast application object segmentation data may in some embodiments be a catheter, which is used to apply the contrast medium. In such embodiments, the contrast application object segmentation data may indicate the position and/or the course of the tip of the catheter, the body of the catheter or the guidewire of the catheter. Contrast application object segmentation data may, like vessel segmentation data, be generated based on a variety of image segmentation approaches, including, but not limited to, U-Net or MRF. The contrast application object segmentation data may then be included in, e.g. stored as part of, second alignment data 213 of vessel roadmap 210.

While contrast application object segmentation 160 is shown in FIG. 1 as processing contrasted vessel images, contrast application object segmentation 160 may also directly process vessel images 112.

Figure 3:
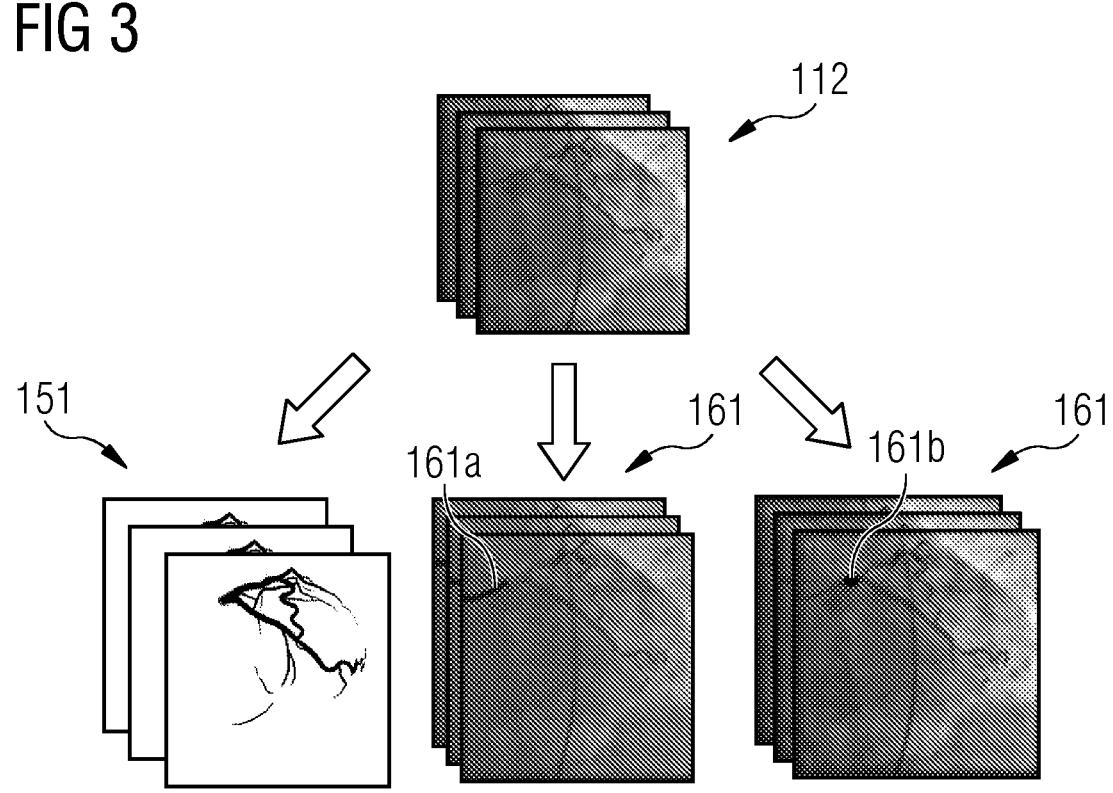
FIG. 3 shows examples of segmentations which may be obtained from a vessel image sequence according to embodiments of the invention.

Both vessel segmentation 150 and contrast application object segmentation 160 perform image segmentation on vessel images 112 or contrasted vessel images, respectively. To better illustrate possible segmentations performed on vessel images 112 or contrasted vessel images, respectively, FIG. 3 shows three example segmentations of a vessel image 112. From left to right, FIG. 3 shows an example of vessel segmentation data 151 and two examples of contrast application object segmentation data 161. As can be seen, vessel segmentation data 151 indicate the position and the course of the vessels in vessel image 112. The left vessel segmentation data 161 indicate the position and the course of a catheter body 161a. The right vessel segmentation data 161 indicate the position of a catheter tip 161b.

Imaging physiological information 111 may be processed by cardiac cycle detection 120. Cardiac cycle detection 120 may identify one or more cardiac cycles within imaging physiological information 111. Cardiac cycle detection 120 may identify at least one cardiac cycle within imaging physiological information 111 by detecting a first R peak and a second R peak within imaging physiological information 111. The first and the second R peak may indicate the start and the end, respectively, of a cardiac cycle. It should be understood that any other graphical deflection of an ECG may be used to indicate the start and the end of a cardiac cycle. Accordingly, cardiac cycle detection may e.g. detect a first and a second P wave.

In some embodiments, detecting the first R peak and the second R peak is based on a combined adaptive electrical activity threshold, which may be the sum of a steep-slope threshold, an integration threshold and an expected beat threshold. In such embodiments, an R peak may be detected if the amplitude of a complex lead is equal to or above an amplitude value of a complex lead, e.g. derived from a 12-lead. Of course, any type of ECG lead may be used to obtain an amplitude of a complex lead, such as a Wilson or a Goldberger ECG.

The steep-slope threshold may initially be set at 60% of the maximum of the amplitude value of the complex lead measured during an initialization period, e.g. 5 s. Once the steep slope threshold as well as the other two thresholds have been initialized, a first QRS complex is detected. During some recalculation interval after detection of the first QRS complex, e.g. 200 ms, the steep-slope threshold may be set at 60% of the maximum of the amplitude value of the complex lead measured during the recalculation interval. Afterwards, the steep-slope threshold may be decreased during a decrease interval, e.g. 1000 ms, i.e. 1200 ms after detection of the first QRS complex, to 60% of its value, i.e. 36% of the measured amplitude of the complex lead. Afterwards, the steep-slope threshold remains at 36%. The decrease may be stopped once a new QRS complex is detected, assuming that the decrease interval has not expired, and the steep-slope threshold may be recalculated as described above. In some embodiments, the steep slope threshold may be set to an average of the currently calculated 60% of the maximum of the amplitude value of the complex lead measured during the recalculation interval and the preceding four calculated values. In some embodiments, the recalculated value of the steep-slope threshold may further be limited to 110% of the previous value of the steep-slope threshold if the recalculated value exceeds 150% of the previous value.

The integration threshold may initially be set to the mean value of the first derivative of the amplitude of the complex lead with regard to time during an integration threshold initialization interval, which may e.g. be 350 ms. Afterwards, the integration threshold is updated based on an update time interval, which may be 350 ms. For every update time interval, the integration threshold may be calculated as the sum of the previous integration threshold and an update value. The update value may be calculated by subtracting from the maximum value of the amplitude of the complex lead during an initial period of the update time interval, e.g. 50 ms, the maximum value of the amplitude of the complex lead during a final period of the update time interval, e.g. 50 ms. The update value may further be divided by a weighting factor, which may e.g. be 150.

The expected beat threshold may initially be set to zero. To determine the expected beat threshold, the average time difference between R peaks may be calculated. In some embodiments, the average time difference may be based on the previous five time differences between R peaks. After a fraction, such as two-thirds, of the average time difference sine the last R peak has expired, the expected beat threshold may be reduced at a fraction of the rate at which the steep-slope threshold may be decreased during the decrease time interval, e.g. at 70% percent of the decrease of the steep-slope threshold. Once the average time difference has expired, the expected beast threshold remains constant. Upon detection of a new R peak, the expected beat threshold may be re-set to zero and be decreased during the next cardiac cycle based on a re-calculated average time difference between R peaks as discussed above. Accordingly, the expected beat threshold may decrease the combined adaptive electrical activity threshold toward the expected end of a cardiac cycle.

It should be noted that the above discussion of how a cardiac cycle may be detected based on combined adaptive electrical activity threshold is merely provided as an example. Cardiac cycle detection 120 may detect cardiac cycles using any suitable analysis of an ECG. For example, cardiac cycle detection 129 may detect cardiac cycles based on performing different types of analyses based transforms, such as short-time Fourier-transform or based on deriving event vectors from the ECG and providing decision rules, which determine cardiac cycles based on the derived event vectors.

The one or more cardiac cycles detected by cardiac cycle detection 120 may be included in, e.g. stored as part of, first alignment data 212. In addition, the one or more cardiac cycles detected by cardiac cycle detection 120 may be provided to EDR detection 130.

EDR detection 130 may derive, based on the one or more cardiac cycles, an electrocardiogram derived respiratory (EDR) signal. The EDR signal may be derived by observing fluctuations between detected different cardiac cycles. Generally speaking, inhaling typically increases and exhaling typically decreases the heart rate. More precisely, such fluctuations can in some embodiments be used to derive the EDR signal by computing for the one or more detected cardiac cycles, the R-to-S peak. The R-to-S peak corresponds to the amplitude of the EDR signal. The R-to-S-peaks are then interpolated using cubic splines to obtain the EDR signal. It should be understood that in some embodiments, other approaches may be used to obtain an EDR signal from the imaging physiological information 111. The EDR signal may be included in, e.g. stored as part of, second alignment data 213.

It should be noted that in some embodiments, EDR detection 130 may be omitted. In such embodiments, second alignment data 213 may only include contrast application object segmentation data. Further, in some embodiments EDR detection 130 may be included in cardiac cycle detection 120. For example, the approach used by cardiac cycle detection 120 to identify one or more cardiac cycles may also be able to directly provide an EDR signal or be able to provide an EDR signal based on an intermediate step of the approach.

Figure 4:
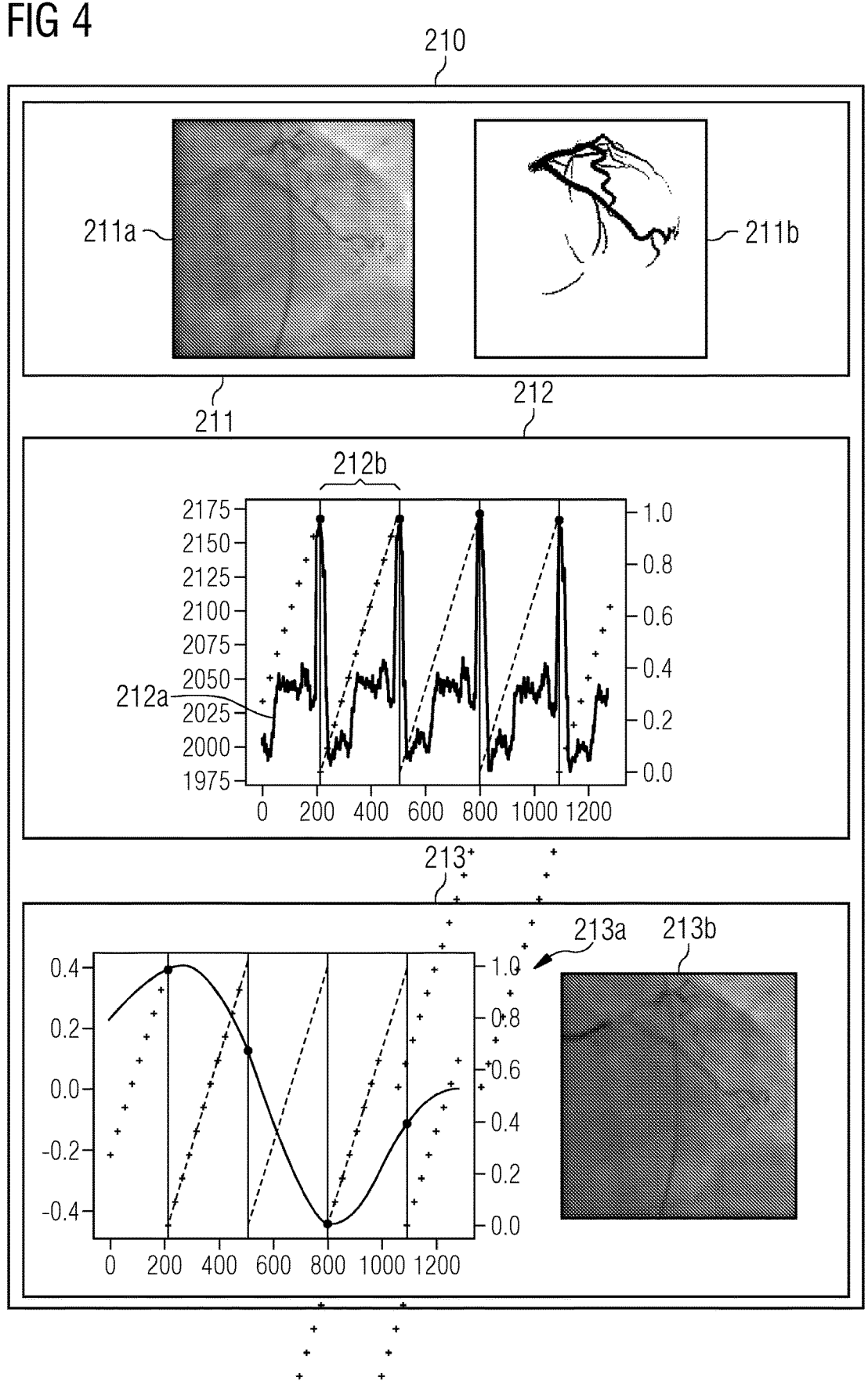
FIG. 4 shows an example of a vessel roadmap according to embodiments of the invention.

As mentioned above, the output of processing entities 120 to 160 forms part of vessel roadmaps 210, which are part of vessel roadmap library 200. To illustrate the data, which may be included in a vessel roadmap 210, FIG. 4 shows an example vessel roadmap 210, including a vessel roadmap image 211, first alignment data 212 and second alignment data 213.

Vessel roadmap image 211 may include a vessel image 211a. Vessel roadmap image 211a corresponds to a vessel image 112 of the vessel image sequence 110, which has been identified by contrast detection 140 as including contrast. Further, vessel roadmap image 211 may include vessel segmentation data 211b generated by vessel segmentation 150. Both vessel roadmap 211a and vessel segmentation data 211b may be used as the roadmap to be laid over a fluoroscopy image during the roadmap deployment phase 300 by overlay vessel roadmap 370 discussed later. Accordingly, vessel roadmap image 211 is the part of vessel roadmap 211 providing the actual vessel roadmap. In some embodiments, vessel roadmap image 211 may in fact correspond to a vessel image 112 recorded as part of the vessel image sequence 110 as well as an image indicating the vessel segmentation data generated by vessel segmentation 150. In some embodiments, vessel roadmap image 211 may only include an image indicating the vessel segmentation data generated by vessel segmentation 150, as illustrated by vessel segmentation data 211b in FIG. 4. In some embodiments, vessel roadmap image 211 may be data indicating the position of vessel pixels, which may subsequently be used to highlight corresponding pixels in a fluoroscopy image as vessel pixels.

First alignment data 212 may include imaging physiological information 111 as recorded as part of the vessel image sequence 110. Since imaging physiological information 111 may in some embodiments be an ECG, imaging physiological information 111 is shown in FIG. 4 as an alignment ECG 212a. Further, first alignment data 212 may include one or more cardiac cycles as detected by cardiac cycle detection 140. In FIG. 4, a cardiac cycle 212b is illustrated as indicted by adjacent R peaks in alignment ECG 212a. While first alignment data 212 of vessel roadmap 210 is shown here as based on an ECG curve, it should be understood that alignment ECG 212a and cardiac cycle 212b may typically be stored within second alignment data 212 as an indication of the ECG value, i.e. e.g. the amplitude of the complex lead discussed above, and the position of the ECG value within a cardiac cycle. Accordingly, the first alignment data may in some embodiments not include the entire alignment ECG 212a. Instead, first alignment data 212 may e.g. be a tuple with the first value indicating the amplitude and the second value indicating the position within a cardiac cycle. In some embodiments, if more than one cardiac cycle has been identified. First alignment data 212 may be a triple with the third value identifying the respective cardiac cycle. In some embodiments, in which cardiac cycle detection 140 is omitted, the cardiac cycle information may be replaced by temporal information indicating an associated point in time of the ECG value relative to other vessel roadmaps 210.

More generally, first alignment data 212 provide data to enable aligning vessel roadmap image 211 with a fluoroscopy image. Vessels shift for a variety of factors, including, but not limited to, cardiac muscle contraction and relaxation, i.e. cardiac motion, as well as breathing. First alignment data 212 enable compensation of vessel shift caused by cardiac motion. To this end, first alignment data 212 provide physiological information relating to the heart. It should therefore be understood that first alignment data 212 generally provide data enabling an alignment of a vessel roadmap with a fluoroscopy image necessitated due to vessel shifts caused by cardiac motion. First alignment data 212 may thus include any cardiac information necessary to compensate such vessel shifts.

Second alignment data 213 may include an EDR signal 213a generated by EDR detection 130, and contrast application object segmentation data 213b generated by contrast application object segmentation 160. EDR signal 213a is shown as a curve in FIG. 4 in order to illustrate EDR signal 213a. However, similarly to the discussion of alignment ECG 212a, EDR signal 213a may in some embodiments be a data set indicating the value of EDR signal 213a as well as the temporal position of the value within the EDR signal curve. Further, as shown in FIG. 4, contrast application object segmentation data 213b may in some embodiments be an image indicating the vessel segmentation data. In some embodiments, contrast application object segmentation data 213b may be data indicating the position of contrast application object pixels.

More generally, second alignment data 213 provide data to enable aligning vessel roadmap image 211 with a fluoroscopy image. While first alignment data 212 are described above as compensating vessel shift caused by cardiac motion, second alignment data 213 may compensate for vessel shift caused by breathing motion. To this end, second alignment data 213 provide both physiological information relating to the breathing and information relating to the position of the contrast application object, which may be shifted due to breathing. It should therefore be understood that second alignment data 213 generally provide data enabling an alignment of a vessel roadmap with a fluoroscopy image necessitated due to vessel shifts caused by breathing motion. Second alignment data 213 may thus include any breathing-related information necessary to compensate such vessel shifts. For example, in some embodiments, second alignment data 213 may include only one of EDR signal 213a and contrast application object segmentation data 213b since in some embodiments only one of the two may be sufficient to compensate vessel shifts cause by breathing motion. For example, in some embodiments EDR signal 213a may be omitted.

As discussed above, contrast application object segmentation data 213b is generated by contrast application object segmentation 160. Accordingly, second alignment data 213 is in some embodiments at least derived from vessel roadmap image 211. In embodiments, in which EDR signal 213a is also present, second alignment data 213 may further be derived from first alignment data 212 in addition to being derived from vessel image 211.

Vessel roadmap library 200 is the output generated by roadmap generation phase 100. This output may subsequently be deployed during roadmap deployment phase 300. In some embodiments, roadmap deployment phase 300 may be a medical intervention, such as a percutaneous coronary intervention (PCI). PCI is performed using fluoroscopy. Accordingly, vessel roadmap library 200 can be laid over the real-time fluoroscopy images during the PCI in order to guide a medical practitioner through the coronary arteries without having to use a contrast medium. In such embodiments, roadmap generation phase 100 may include coronary angiography, which is used to obtain a coronary angiogram.

The coronary angiogram in such embodiments corresponds to vessel image sequence 110. Since roadmap deployment phase 300 may be a medical intervention, it may also be referred to as an online phase, while roadmap generation phase 100 may also be referred to as an offline phase.

Roadmap deployment phase 300 performs real-time fluoroscopy 310 in order to obtain a real-time fluoroscopy image 311 and corresponding real-time first fluoroscopy information 312 and real-time first fluoroscopy information 313.

Real-time fluoroscopy image 311 may be an image obtained using real-time fluoroscopy 310. During real-time fluoroscopy 310, no contrast medium needs to be injected into vessel or a vessel tree given that vessel images are provided by vessel roadmap library 200. Accordingly, since fluoroscopy is typically performed using X-ray, the only radio-opaque structure visible in the real-time fluoroscopy image 311, apart from e.g. bones of the patient, is a fluoroscopy object. Like vessel image 112, real-time fluoroscopy image 311 may be stored as a DICOM image.

First fluoroscopy information 312 may be any kind of fluoroscopy physiological information of a patient on whom real-time fluoroscopy 310 is performed and which may be used to overlay and align vessel roadmaps 211 with fluoroscopy image 311. In some embodiments, first fluoroscopy information 312 may include an ECG recorded while real-time fluoroscopy 310 is performed. In such embodiments, first fluoroscopy information 312 may be processed by cardiac cycle detection 320 to identify one or more cardiac cycles based on the ECG. The identified one or more cardiac cycles may then also be included in the real-time fluoroscopy information 312. Cardiac cycle detection 320 may detect one or more cardiac cycles in the fluoroscopy ECG in the same manner as cardiac cycle detection 140 may detect one or more cardiac cycles in the ECG recorded while vessel image sequence 110 is obtained.

The one or more cardiac cycles identified by cardiac cycle detection 320 may be processed by EDR detection 330. EDR detection 330 may derive an EDR signal based on the identified one or more cardiac cycles in the same manner as describe with respect to EDR detection 130. The derived EDR signal may then be included in second real-time fluoroscopy information 313.

As discussed above, in some embodiments EDR detection 130 may be omitted. In such embodiments, EDR detection 330 may additionally derive an EDR signal based on the one or more cardiac cycles included in first alignment data 212 of a vessel roadmap 210 selected by roadmap selection 371, which will be discussed in more detail below. It should be noted that EDR detection 330 may also be omitted if EDR detection 130 is omitted. In such embodiments, vessel roadmap overlay 370 and vessel roadmap selection 371 may operate without any EDR signals.

In addition to the EDR signal, second real-time fluoroscopy information 313 may include fluoroscopy object segmentation data identifying a position of a fluoroscopy object in fluoroscopy image 311. The fluoroscopy object may be a fluoroscopy catheter, which may e.g. be used during a medical intervention, such as PCI. As opposed to the contrast application object, which may also be a catheter, the fluoroscopy catheter may typically not be used to inject contrast medium into a vessel, though it may still be configured for that purpose. The fluoroscopy segmentation data may be generated by fluoroscopy segmentation 360 based on a variety of image segmentation approaches as discussed above with regard to vessel segmentation 150 and contrast application object 160, such as based on CNNs or MRFs.

Figure 5:
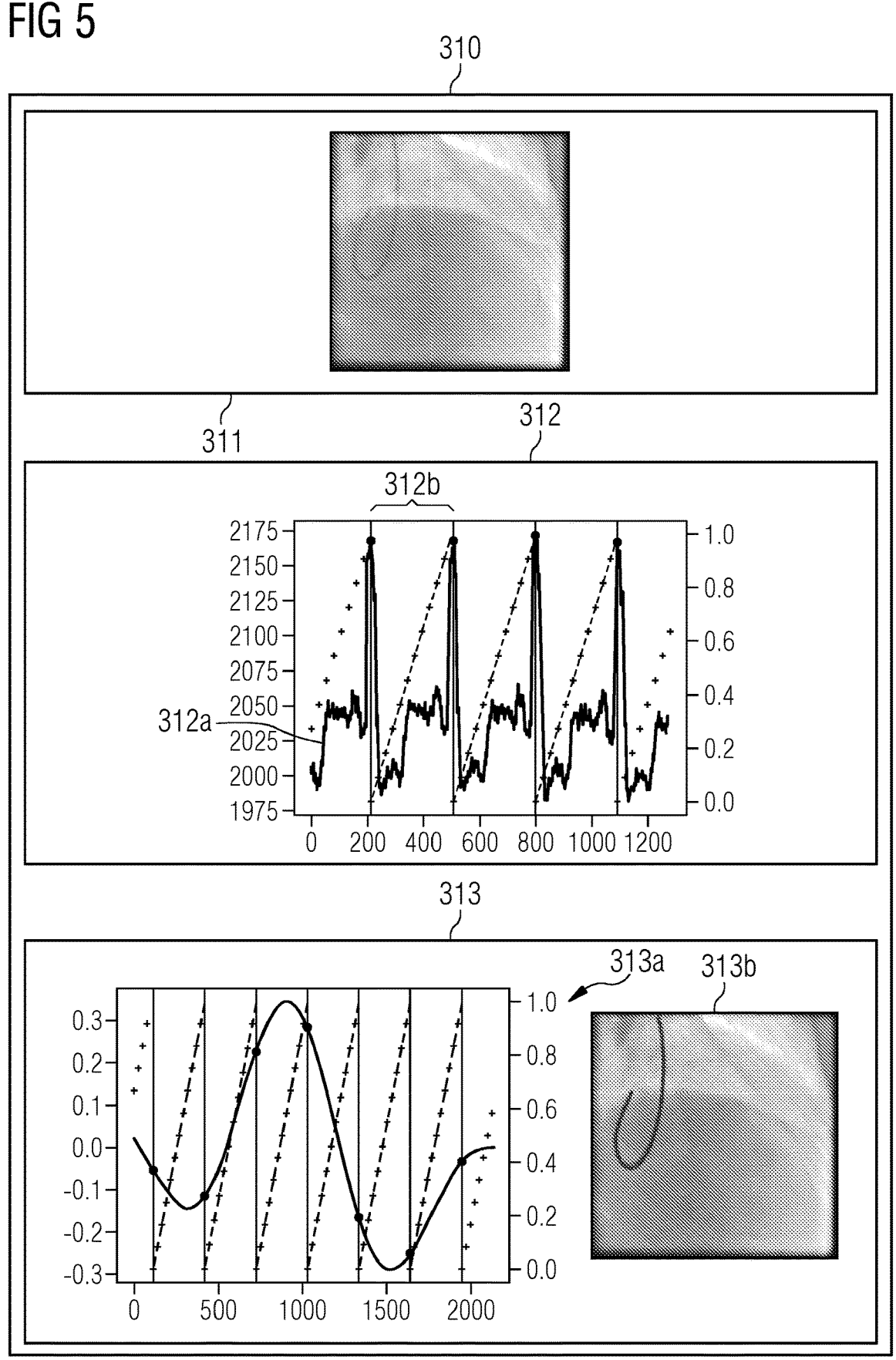
FIG. 5 shows an example of a real-time fluoroscopy image and associated first and second fluoroscopy information according to embodiments of the invention.
Figure 6:
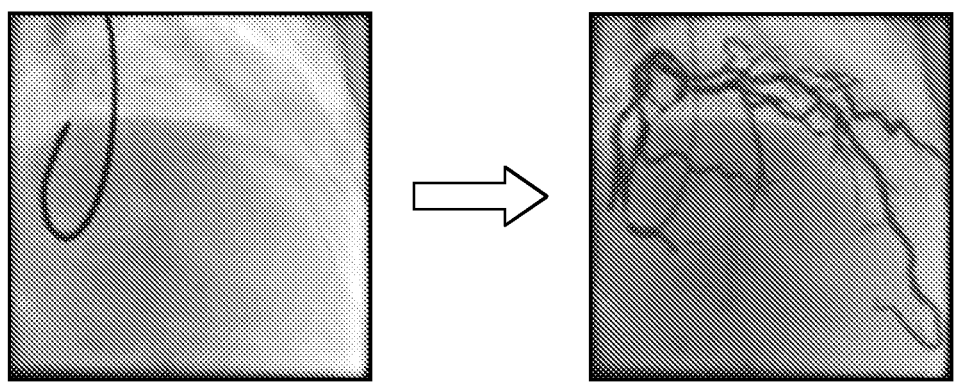
FIG. 6 shows examples of laying a vessel roadmap over a real-time fluoroscopy according to embodiments of the invention.

The data recorded by real-time fluoroscopy 310 and processed by processing entities 320, 330 and 360 is illustrated in FIG. 5.

As shown in FIG. 5, real-time fluoroscopy image 311 includes the fluoroscopy image recorded by real time fluoroscopy 310. Typically, only the fluoroscopy object is visible in real-time fluoroscopy image 311, unless other radio-opaque structures of the patient are visible.

First fluoroscopy information 312 includes fluoroscopy ECG 312a recorded during real-time fluoroscopy and one or more cardiac cycles 312b identified by cardiac cycle detection 320. Analogously to first alignment data 212, first fluoroscopy information 312 may include any cardiac information necessary to compensate vessel shifts when laying one of the vessel roadmap images 211 over real-time fluoroscopy image 311. Accordingly, in some embodiments, first fluoroscopy information 312 may only include fluoroscopy ECG 312a or may include other or additional information to compensate vessel shifts when laying one of the vessel roadmap images 211 over real-time fluoroscopy image 311. Further, while fluoroscopy ECG 312a is illustrated as the ECG curve recorded during real-time fluoroscopy 310, in some embodiments only values corresponding to the point on the ECG curve may be included in first real-time fluoroscopy information 312, e.g. a tuple or a triple, respectively, including the amplitude value of the complex lead of the fluoroscopy ECG 312a, the temporal position within the ECG and an indication of the identified cardiac cycle.

Second real-time fluoroscopy information 313 may include a fluoroscopy EDR signal 313a generated by EDR detection 330 and contrast application object segmentation data 313b generated by contrast application object segmentation 360. EDR signal 313a is shown as a curve in FIG. 5 in order to illustrate fluoroscopy EDR signal 313a. However, similarly to the discussion of preceding discussions of curves, i.e. alignment ECG 212a, EDR signal 213a and fluoroscopy ECG 312a, fluoroscopy EDR signal 313a may in some embodiments be a data set indicating the value of fluoroscopy EDR signal 313a as well as the temporal position of the value within the fluoroscopy EDR signal curve. Further, as shown in FIG. 5, fluoroscopy object segmentation data 313b may in some embodiments be an image indicating the vessel segmentation data. In some embodiments, fluoroscopy object segmentation data 313b may be data indicating the position of fluoroscopy object pixels.

The data obtained by real-time fluoroscopy 310 and vessel roadmap library 200 may be provided to a vessel roadmap overlay 370. Vessel roadmap overlay 370 may, based on first alignment data 212, second alignment data 213, real time first fluoroscopy information 312 and real-time second fluoroscopy information 313 overlay one of the vessel roadmap images 211 on real-time fluoroscopy image 311. To this end, vessel roadmap overlay 370 may, via roadmap selection 371, select one of the vessel roadmaps 210 from roadmap library 200 based on comparing first real-time fluoroscopy information 312 with first alignment data 212 of each vessel roadmap 210 in roadmap library 200.

More precisely, roadmap selection 371 may compare alignment ECG 212a of each vessel roadmap 210 with fluoroscopy ECG 312a to determine a vessel roadmap 210 approximately corresponding, in terms of the respective alignment ECG 212a, to fluoroscopy ECG 312a. By selecting a vessel roadmap based on an ECG comparison, a vessel roadmap 210 can be chosen in which the position of the vessels is most similar, due to a similar shift caused by similar cardiac motion, to the position of the vessels in real time fluoroscopy image 311.

In addition, in some embodiments roadmap selection 371 may select a vessel roadmap 210 from roadmap library 200 based on comparing second real-time fluoroscopy information 313 with the second alignment data 213 of each vessel roadmap 210. More precisely, roadmap selection 371 may additionally compare EDR signal 213a of each vessel roadmap 210 with fluoroscopy EDR signal 313a to determine a vessel roadmap 210 approximately corresponding, in terms of the respective EDR signal 213a, to fluoroscopy EDR signal 313a. By selecting a vessel roadmap additionally based on an EDR signal comparison, a vessel roadmap 210 can be chosen in which the position of the vessels is most similar, due to a similar shift caused by similar breathing motion, to the position of the vessels in real time fluoroscopy image 311.

In summary, vessel roadmap selection 371 may, based on an ECG comparison and in some embodiments based on an additional EDR comparison, select a vessel roadmap 210 from vessel roadmap library 200. The vessels visible in the accordingly selected vessel roadmap 210 have experienced a similar shift to cardiac motion as well as breathing motion. The position of the vessels visible in the accordingly selected vessel roadmap 210 may thus be approximately similar to the position of the vessels in real-time fluoroscopy image 311.

Vessel roadmap overlay 370 may lay the vessel roadmap image 211 of the selected vessel roadmap 210 over the real-time fluoroscopy image 211. In some embodiments, vessel roadmap overlay 370 may perform the overlay by superimposing vessel image 211a over real-time fluoroscopy image 311. Superimposing vessel image 211a may in some embodiments be achieved by transparent color blending, i.e. two pixel values from vessel image 211a, one corresponding to the pixel value as recorded originally in corresponding vessel image 112 and one corresponding to a color selected for vessel representation, can be simultaneously shown. In some embodiments, vessel roadmap image 211a may be overlaid with a variable level of opacity. In some embodiments, vessel segmentation data 211b may be integrated into real-time fluoroscopy image 311, e.g. by changing the values of the pixels indicated as vessel pixels by vessel segmentation data 211b.

Figure 7:
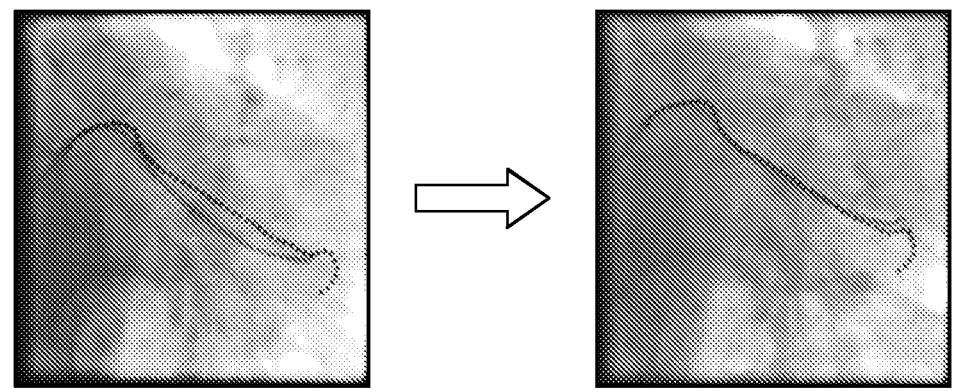
FIG. 7 shows an example of aligning a vessel roadmap and a real-time fluoroscopy image according to embodiments of the invention.

FIG. 7 provides an example of vessel overlay 370. On the left, real-time fluoroscopy image 311 with a visible fluoroscopy object can be seen prior the overlay of a vessel roadmap image 211. On the right, real-time fluoroscopy image 311 can be seen after the overlay of a vessel roadmap image 211.

Roadmap image 211 laid over real-time fluoroscopy image 311 by vessel roadmap overlay 370 may finally be aligned by vessel roadmap alignment 380. Vessel roadmap alignment 380 aligns overlaid vessel roadmap image 211 and real-time fluoroscopy image 311 based on second alignment data 213 and real time second fluoroscopy information 313. In particular, vessel roadmap alignment 380 aligns the position of the contrast application object with the positon of the fluoroscopy object based on contrast application object segmentation data 213b and fluoroscopy object segmentation data 313b. In other words, vessel roadmap alignment 380 aligns the positions of the contrast application object and the fluoroscopy object, which may both be catheters. For example, both object segmentation data 213b and fluoroscopy object segmentation data 313b may each indicate, in some embodiments, a centerline of the respective catheter.

In such embodiments, vessel roadmap alignment 380 aligns vessel roadmap 211 with real-time fluoroscopy image 311 by minimizing the sum of squared distances between closest points on the centerlines of the catheters. It should be noted that aligning may include in-plane rotation, i.e. rotating the roadmap to achieve better alignment. By aligning the positions of the contrast application object with the positon of the fluoroscopy object, any vessel shift caused by breathing motion may be further compensated in order to further improve the accuracy of overlaid vessel roadmap 210.

FIG. 7 provides an example of an alignment by vessel roadmap alignment 380 based on catheter centerlines. As can be seen on the left side of FIG. 7, prior to alignment by vessel roadmap alignment 380, the centerlines are apart from one another. After alignment by vessel roadmap alignment 380, the centerlines are approximately in the same position.

In summary, vessel roadmap 370, vessel roadmap selection 371 and vessel roadmap overlay 380 select, overlay and align one of the vessel roadmaps 210 with fluoroscopy image 311 in order to provide a vessel roadmap during roadmap deployment phase 300. By taking into account first alignment data 212, second alignment data 213, the first fluoroscopy information 312 and the second fluoroscopy information 313, a vessel roadmap can be selected, overlaid and aligned with fluoroscopy image 311, which corresponds to the actual position of the vessels in fluoroscopy image 311 without having to inject contrast medium. Thus, vessel roadmap 370, vessel roadmap selection 371 and vessel roadmap overlay 380 compensate any motion of the vessels, such as cardiac motion or breathing motion, in order to correctly overlay one of the vessel roadmaps 210 over fluoroscopy image 311. Further, the duration of the fluoroscopy may be reduced based on generated vessel roadmap library 200, thereby reducing radiation exposure. This may especially be true during PCI, since the properly selected, overlaid and aligned roadmap may enable fast and reliable navigation with the fluoroscopy object through the vessels.

It should be noted that the processing entities discussed with regard to the DRM workflow of FIG. 1 may in some embodiments be implemented as a single computer program or may be implemented as separate computer programs for each of the roadmap generation phase 100 and the roadmap deployment phase 300. Further, any one of the individual processing entities may be implemented individually or in some combination as a computer program. For example, contrast application object segmentation 160 and fluoroscopy segmentation 360 may be implemented as a combined computer program or may in fact be one computer program, which may be deployed as contrast application object segmentation 160 or fluoroscopy segmentation 360, depending on the current state of the DRM workflow. The same applies for example to EDR detection 130 and EDR detection 330 or cardiac cycle detection 120 and 320. In some embodiments, any one of the processing entities may either alone or in some combination as discussed with regard to computer programs be implemented as an application specific integrated circuit (ASIC) or may be implemented on a field programmable gate array (FPGA) or may be implemented as some other suitable type of circuitry.

It should be understood that the DRM workflow of FIG. 1 may be performed by any medical imaging apparatus capable of recording vessel images and fluoroscopy images. Accordingly, the DRM workflow may be performed by one medical imaging apparatus. In some embodiments, roadmap generation phase 100 or at least some part thereof may be performed by an angiography device. In some embodiments, the angiography device may only record vessel image sequence 110. In such embodiments, vessel image sequence 110 may be provided to a fluoroscopy apparatus, which then generates vessel roadmap library 200. Alternatively or in addition, vessel image sequence 110 may be processed on a general purpose computing device according to roadmap generation phase 100 in order to generate vessel roadmap library 200. In such embodiments, generated vessel roadmap library 200 may then be provided to the fluoroscopy apparatus. In some embodiments, the angiography device may be capable of generating vessel roadmap library 200 based on the recorded vessel image sequence 110. In such embodiments, generated vessel roadmap library 200 may be provided to the fluoroscopy device. It will be understood that the DRM workflow of FIG. 1 may be performed by any suitable combination of devices as required to generate vessel roadmap library 200 and to correctly overlay on of the vessel roadmaps 210 over fluoroscopy image 311.

Figure 2A:
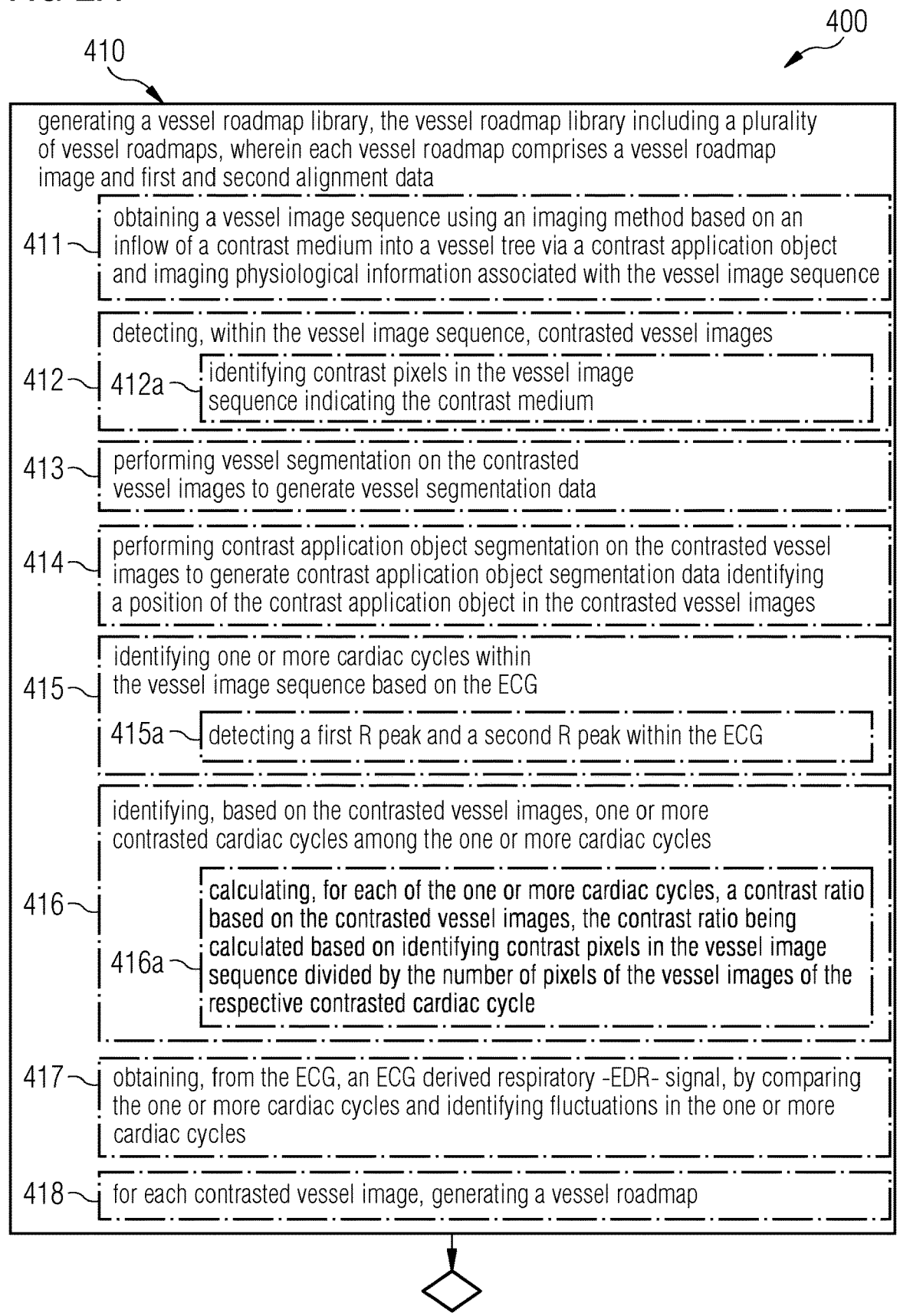

FIGS. 2A and 2B illustrate the steps of a DRM method 400 according to embodiments of the invention. DRM method 400 may be implemented by the DRM workflow discussed above. In order to avoid repetitions, only aspects not already mentioned above in the discussion of the DRM workflow FIG. 1 will be discussed in the following.

Throughout FIGS. 2A and 2B, steps shown in dashed boxes are used to indicate optional steps. Some of these optional steps, such as steps 411 to 418, are optional parts of a step, such as step 410, as indicated by these steps being shown inside the box the respective step.

Steps 410 to 441 will be discussed in the order shown in FIGS. 2A and 2B. However, it will be understood by those skilled in the art that this description is in no way meant to imply that the steps need to be performed in this order. Rather, the steps can be performed in any order suitable to dynamically provide a vessel roadmap. For example, Steps 415 and 416 may be performed concurrently or step 415 may be performed after step 416. The same is true for e.g. steps 413 and 414.

In step 410, DRM method 400 generates vessel roadmap library 200, which includes a plurality of vessel roadmaps 210, wherein each vessel roadmap 210 comprises a vessel roadmap image 211 as well as first alignment data 211 and second alignment data 212. Step 410 may be performed generally by roadmap selection phase 100 and the corresponding processing entities 110 to 160. In more detail, step 410 may be performed as discussed below with regard to steps 411 to 418, which are optional parts of step 410.

In step 411, DRM method 400 may obtain a vessel image sequence using an imaging method based on an inflow of a contrast medium into a vessel tree via a contrast application object and imaging physiological information 111 associated with vessel image sequence. Step 411 may be performed by vessel image sequence 110.

In step 412, DRM method 400 may detect, within vessel image sequence 110, contrasted vessel images. Step 412 may further include a sub-step 412a, in which DRM method 400 may identify contrast pixels in the vessel image sequence 110 indicating the contrast medium. Both steps 412 and 412a may be performed by contrast detection 140.

In step 413, DRM method 400 may perform vessel segmentation on the contrasted vessel images to generate vessel segmentation data Step 413 may be performed by vessel segmentation 150.

In step 414, DRM method 400 may perform contrast application object segmentation on the contrasted vessel images to generate contrast application object segmentation data, which may identify a position of the contrast application object in the contrasted vessel images. Step 414 may be performed by contrast application object segmentation 160.

In step 415, DRM method 400 may identify one or more cardiac cycles within the vessel image sequence 110 based on the ECG. Step 415 may include a sub-step 415a, in which DRM method 400 detects a first R peak and a second R peak within the ECG. Steps 415 and 415a may be performed by cardiac cycle detection 110.

In step 416, DRM method 400 may identify, based on the contrasted vessel images, one or more contrasted cardiac cycles among the one or more cardiac cycles. To identify one or more contrasted cardiac cycles, step 416 may further include a step 416a, which calculates, for each of the one or more cardiac cycles, a contrast ratio based on the contrasted vessel images. In Step 416, DRM method 400 may calculate the contrast ratio based on identifying contrast pixels, i.e. pixels indicative of contrast medium, in the vessel image sequence divided by the number of pixels of the vessel images of the respective contrasted cardiac cycle. Identifying contrasted cardiac cycles may help to identify which of the recorded cardiac cycles may include vessel images providing a clear illustration of the vessels. Generally speaking, the more contrast medium is detected in a cardiac cycle, the clearer are the image of the vessels. In some embodiments, this may be determined based on the contrast ratio calculated in step 416a. Since steps 416 and 416a rely on the detection of contrast medium as well as of cardiac cycles, they may be performed by cardiac cycle detection 120 and contrast detection 140 in conjunction.

In step 417, DRM method 400 may obtain, from the ECG, an EDR signal, by comparing the one or more cardiac cycles and identifying fluctuations in the one or more cardiac cycles. Step 417 may be performed by EDR detection 417.

In step 418, DRM method 400 may, for each contrasted vessel image, generate a vessel roadmap 210. Each generated vessel roadmap 210 may comprise the contrasted vessel image and the vessel segmentation data as vessel roadmap image 211, imaging physiological information 111 in first alignment data 212 and the contrast application object segmentation data in the second alignment data 213. Step 418 may be performed by the various processing entities which generate data included in, e.g. stored as part of, vessel roadmap 210, i.e. cardiac cycle detection 120, EDR detection 130, contrast detection 140, vessel segmentation 150 and contrast application object segmentation 160.

In step 420, DRM method 400 obtains real-time fluoroscopy image 311 as well as corresponding real-time first fluoroscopy information 312 and second fluoroscopy information 313. Step 420 may generally be performed by real-time fluoroscopy 310, cardiac cycle detection 320, EDR detection 330 and fluoroscopy object segmentation 360.

In step 421, DRM method 400 may obtain fluoroscopy physiological information associated with the fluoroscopy image, which may be included in the first real-time fluoroscopy information 312. Step 421 may be performed by real-time fluoroscopy 310.

In step 422, DRM method 400 may perform fluoroscopy object segmentation on fluoroscopy image 311 to generate fluoroscopy object segmentation data, which may identify a position of a fluoroscopy object in fluoroscopy image 311. The generated fluoroscopy object segmentation data may be included in second real-time fluoroscopy information 313. Step 422 may be performed by fluoroscopy object segmentation 360.

In step 423, DRM method 400 may identify one or more cardiac cycles based on the ECG. The identified one or more cardiac cycles may be included in first real-time fluoroscopy information 312. Step 423 may be performed by cardiac cycle detection 320.

In step 424, DRM method 400 may obtain, from the ECG, an EDR signal based on the identified one or more cardiac cycles. The EDR signal may be included in second real-time fluoroscopy information 313. Step 424 may be performed by EDR detection 330.

In step 430, DRM method 400 overlays a vessel roadmap image 211 of vessel roadmap library 200 with the real-time fluoroscopy image 311 based on first alignment data 212, second alignment data 213, as well as real-time first fluoroscopy information 312 and real-time second fluoroscopy information 313. Step 430 may generally be performed by vessel roadmap overlay 370 and vessel roadmap section 371.

In step 431, DRM method 400 may select a vessel roadmap 210 from the roadmap library 200 based on comparing first real-time fluoroscopy information 312 with first alignment data 212 of each vessel roadmap 200 of the roadmap library 200. Step 431 may be performed by vessel roadmap overlay 370 and vessel roadmap selection 371.

In step 432, DRM method 400 may further select a vessel roadmap 210 from the vessel roadmap library based on comparing second real-time fluoroscopy information 313 with second alignment data 213 of each vessel roadmap 210 of the roadmap library 200. Step 432 may be performed by vessel roadmap overlay 370 and vessel roadmap selection 371.

In step 440, DRM method 400 aligns vessel roadmap image 211 and real-time fluoroscopy image 311 based on second alignment data 213 and real time second fluoroscopy information 313. Step 440 may be performed by vessel roadmap alignment 380.

In step 441, DRM method 400 may, in order to align vessel roadmap image 211 and real-time fluoroscopy image 311, align the position of the contrast application object with the positon of the fluoroscopy object. Step 441 may be performed by vessel roadmap alignment 380.

As already discussed above with regard to the DRM workflow of FIG. 1, both the DRM workflow and corresponding DRM method 400 of FIGS. 2A and 2B may be performed by either a single device providing all means which may be needed to perform the method of FIG. 1, or a combination of devices. Devices, which may be used to perform parts or all of the DRM workflow of FIG. 1 as well as of corresponding DRM method 400 of FIGS. 2A and 2B, will be discussed in the following with regard to FIGS. 8 to 11.

Figure 8:
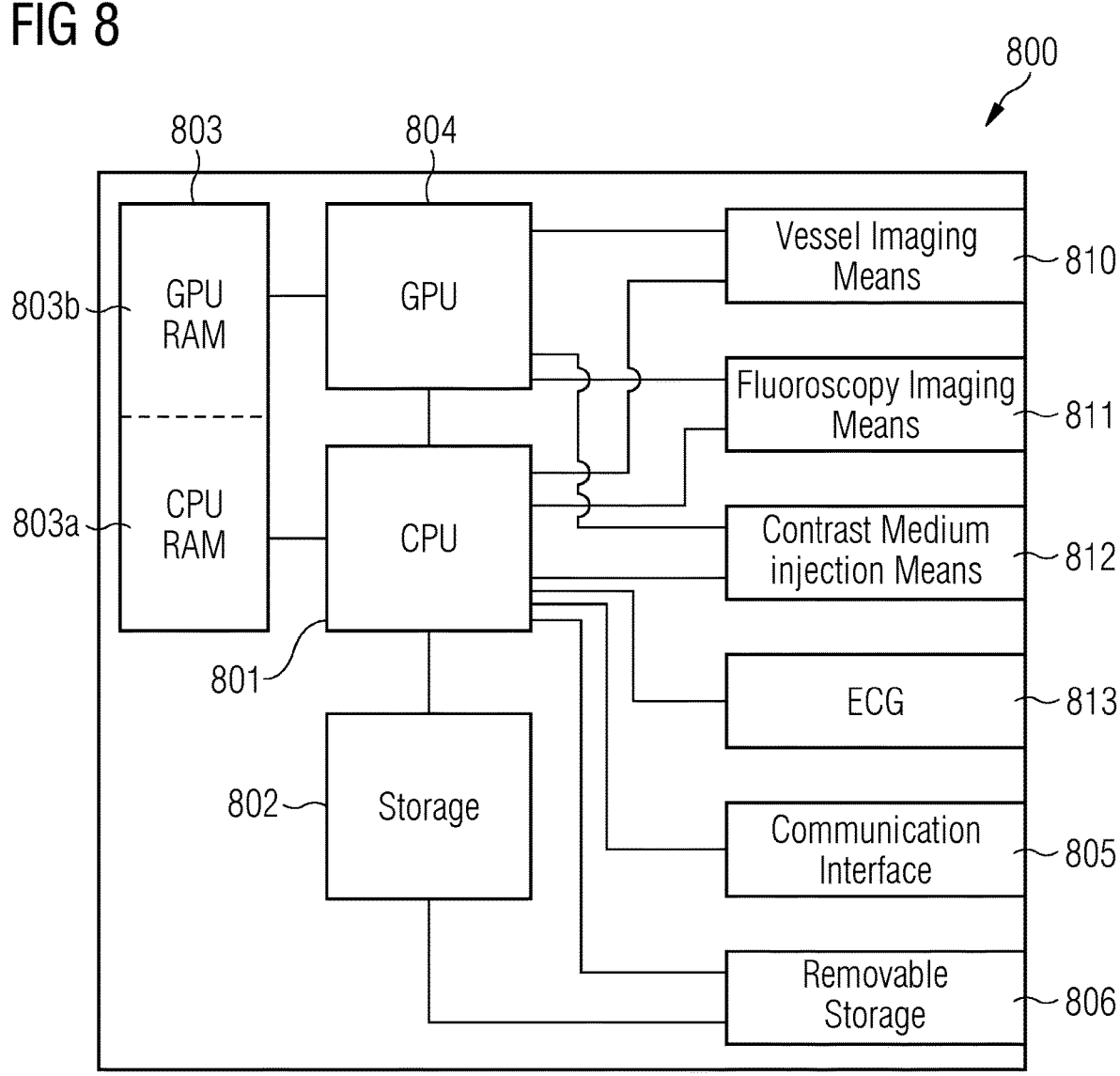
FIG. 8 shows an example of a DRM device configured to perform the DRM workflow and the DRM method according to embodiments of the invention.

FIG. 8 shows a DRM device 800, which is configured to perform the DRM workflow of FIG. 1 and DRM method 400 of FIGS. 2A and 2B. DRM device 800 includes a central processing unit (CPU) 801, storage 802 and GPU random access memory (RAM) 803*a*. CPU 801 may be any type of processing unit capable of executing instructions stored in storage 802. For example, CPU 801 may include one or more general purpose single processor cores based on the x86 instruction set, the x86-64 instruction set, the RISC-V instruction set or the ARM instruction set. In some embodiments, CPU 801 may be an ASIC or an FPGA specifically adapted to perform the DRM workflow of FIG. 1 and corresponding DRM method 400 of FIGS. 2A and 2B. Storage 802 may be any type of storage configured to store machine-readable code instructing CPU 801 to perform the DRM workflow of FIG. 1 and corresponding DRM method 400 of FIGS. 2A and 2B. Further, storage 802 may store vessel image sequence 110, vessel roadmap library 210, fluoroscopy image 311, first fluoroscopy information 312 and second fluoroscopy information 313. Storage 802 may be a NAND or a NOR flash drive or an electro-mechanical data storage device, such as a hard disk, or any other means suitable for storing computer-readable instructions and data. RAM 803*a* may be any suitable type of random access memory enabling fast storage and retrieval of instructions or other data for CPU 801.

DRM device 800 may further include a graphical processing unit (GPU) 804. GPU 804 may be any kind of processing unit specifically adapted to image processing, i.e. a processing unit configured to provide accelerated processing of images, image frames and associated data. GPU 804 may also be used to accelerate processing of machine-learning or similar instructions, e.g. instructions related to a CNN. Accordingly, GPU 804 may be used to implement any or all of the processing entities of the DRM workflow of FIG. 1 related to image processing, i.e. contrast detection 140, vessel segmentation 150, contrast application object segmentation 160, fluoroscopy object segmentation 360, vessel roadmap overlay 370, roadmap selection 371 and vessel roadmap alignment 380. It will be understood that GPU 804 may also implement these processing entities and the corresponding method steps of DRM method 400 in conjunction with CPU 801. In some embodiments, GPU 804 may also be integrated into CPU 801 to form a system on chip (SoC). In some embodiments, GPU 804 may also be omitted and CPU 801 may perform any imaging related aspects of the DRM workflow and DRM method 400.

GPU 804 may be coupled to GPU RAM 803*b*, which, like CPU RAM 803*a*, may be any suitable type of random access memory enabling fast storage and retrieval of instructions or other data for GPU 804.

As indicated in FIG. 8, CPU RAM 803*a* and GPU RAM 803*b* may form a unified RAM 803 enabling both CPU 801 and GPU 804 to be able to distribute unified RAM 803 as needed between CPU 801 and GPU 804. It will be understood, however, that CPU RAM 803*a* and GPU RAM 803*b* may be separate RAMs. In some embodiments, unified RAM 803 or CPU RAM 803*a* and GPU RAM 803*b* may also be coupled to storage 802 (connection not shown), to provide fast data exchange between RAM 803 or CPU RAM 803*a* and GPU RAM 803*b* and storage 802.

DRM device 800 may further include vessel imaging means 810. Vessel imaging means 810 may be any kind of means configured to record vessel images based on injecting a radio-opaque contrast medium into vessels via a contrast application object and rendering the radio-opaque contrast medium visible via e.g. an x-ray. Accordingly, vessel imaging means 810 may be an x-ray. Vessel imaging means 810 may accordingly record vessel images 112, which may be stored as DICOM images in storage 802. Since Vessel imaging means 810 rely on injection of a radio-opaque contrast medium, DRM device 800 may also include contrast medium injection means 812. Contrast medium injection means 812 may be any kind of means configured to be used for the injection of a radio-opaque contrast medium into vessels, such as a catheter connected to a contrast medium source, which may include controls to regulate the flow of contrast medium. Both vessel imaging means 810 and contrast medium injection means 812 may be used to implement recording vessel imaging sequence 110 as well as the corresponding method steps of DRM method 400.

DRM device 800 may further include fluoroscopy imaging means 811. Fluoroscopy imaging means 811 may be any kind of means configured to obtain real-time fluoroscopy image 312. Accordingly, fluoroscopy imaging means 811 may be an x-ray providing real-time x-ray images of a fluoroscopy catheter. Fluoroscopy imaging means 811 may thus be used to implement real-time fluoroscopy 310 as well as the corresponding method steps of DRM method 400.

DRM device 800 may further include ECG 813. ECG 813 may record an ECG during the recording of vessel image sequence 110 in order to obtain imaging physiological information 111. Further, ECG 813 may record an ECG during the recording of fluoroscopy image 312 in order to obtain first fluoroscopy information 312. CPU 801 may receive the data from ECG 813 in order to implement cardiac cycle detection 120, cardiac cycle detection 320, EDR detection 130 and EDR detection 330 as well as the corresponding method steps of DRM method 400.

Finally, DRM device 800 may include communications interface 805 and removable storage 806. Communications interface may be any kind of interface configured to convey data to another device, such as a wireless interface, e.g. Bluetooth or WiFi, or a wired interface, such as Ethernet. Removable storage 806 may be any kind of storage medium, which can be coupled with and decoupled from DRM device 800 by a user during operation of DRM device 800, such as a Secure Digital (SD) card, a hard-disk or flash drive connectable via Universal Serial Bus (USB). Both communications interface 805 and removable storage 806 may be used to provide data, such as vessel roadmap 200, to another device, which may likewise want to deploy vessel roadmap 200. It will be understood that either one of communications interface 805 and removable storage 806 may be omitted since one of them may suffice to convey data. Also, if there is no need to convey data, DRM device 800 may omit communications interface 805 and removable storage 806.

The lines coupling various components inside DRM device 800 may be any kind of connection suitable to enable conveying data between the various components. For example, the lines may illustrate a peripheral Component Interconnect Express (PCIExpress) bus or some other suitable bus system. It will be understood that the lines are used for illustration purposes only, i.e. all components may e.g. be coupled to a single bus enabling data exchange between all components of DRM device 800.

Figure 9:
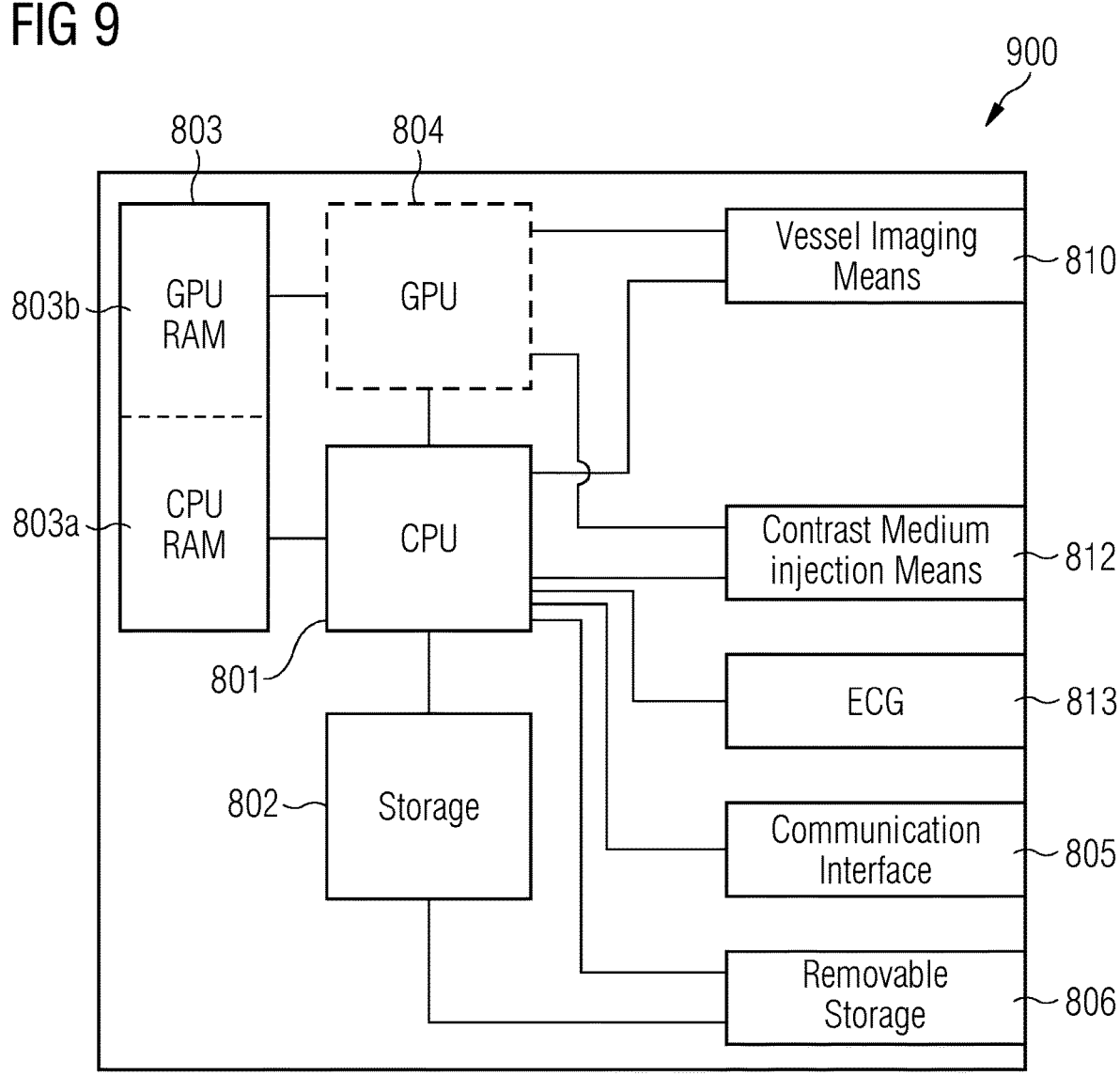
FIG. 9 shows an example of a vessel imaging device configured to perform parts of the DRM workflow and the DRM method according to embodiments of the invention.
Figure 10:
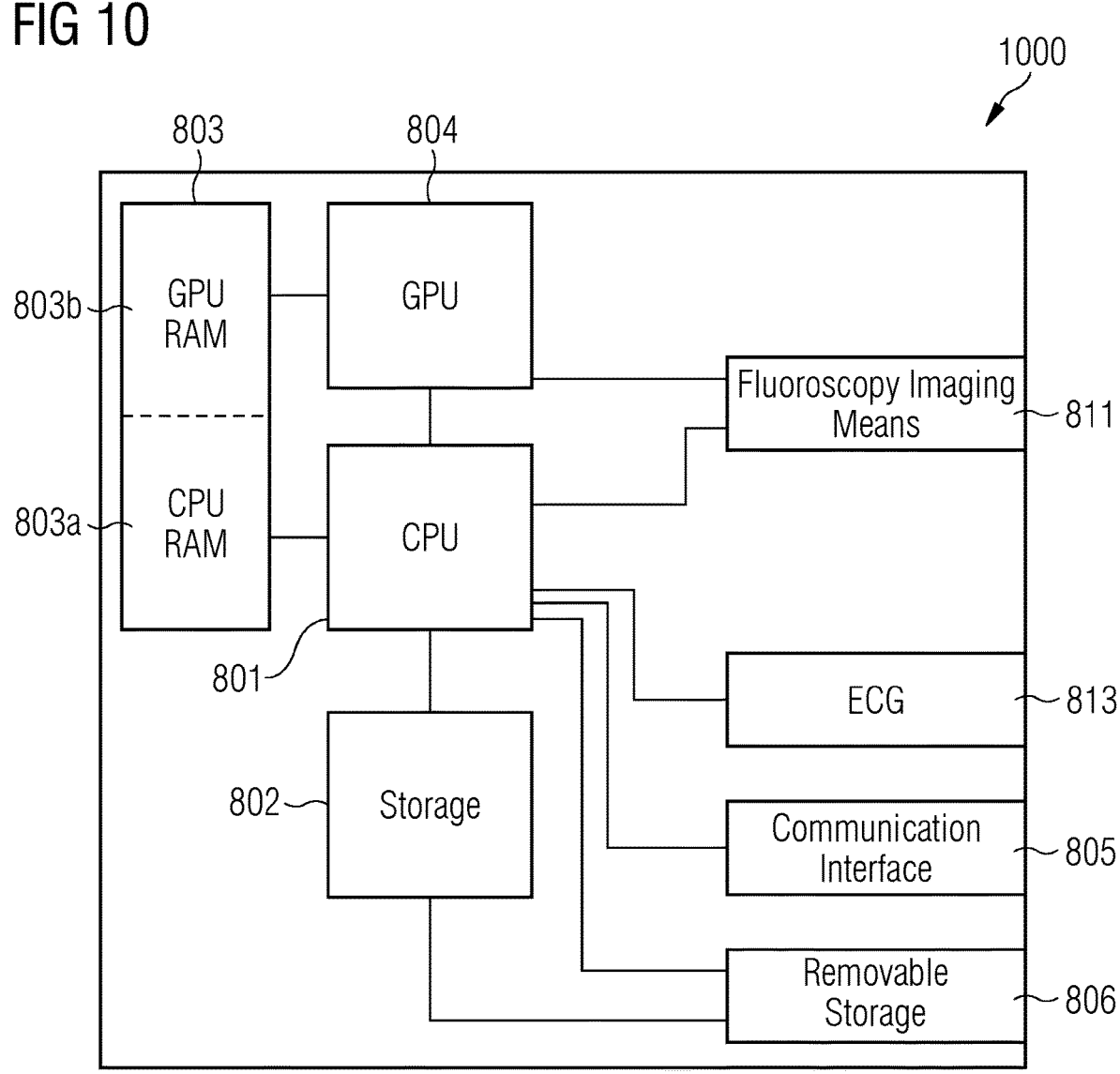
FIG. 10 shows an example of a fluoroscopy device configured to perform parts of the DRM workflow and the DRM method according to embodiments of the invention.
Figure 11:
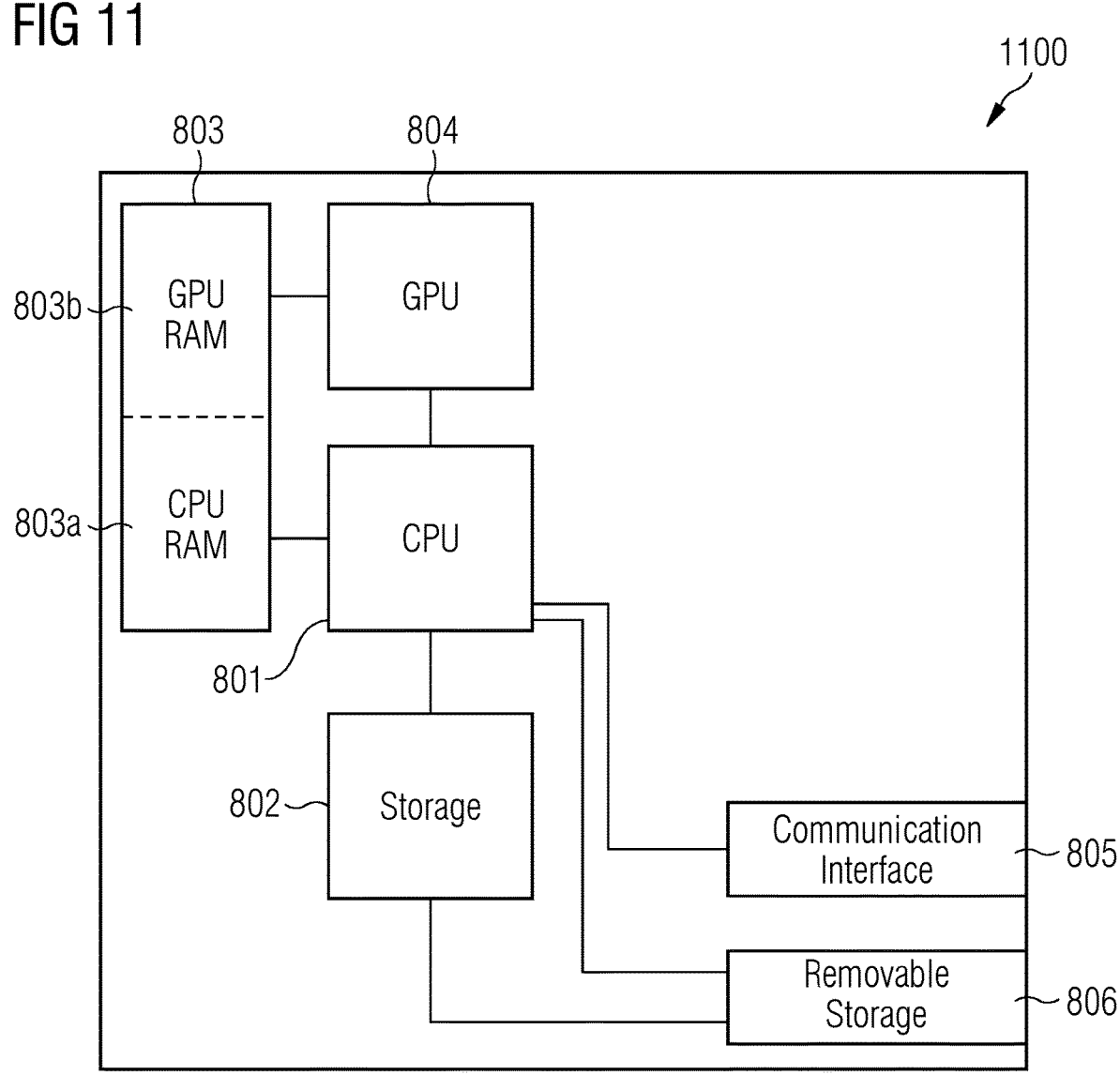
FIG. 11 shows an example of a general purpose computing device configured to perform parts of the DRM workflow and the DRM method according to embodiments of the invention.

FIGS. 9 to 11 respectively show devices, which implement parts of the functionality of DRM device 800. Accordingly, FIGS. 9 to 11 retain the reference signs of FIG. 8, where appropriate.

FIG. 9 shows a vessel imaging device 900, which may be configured to record vessel image sequence 110. Accordingly, vessel imaging device 900 includes vessel imaging means 810 and contrast medium injection means 812. Vessel imaging device 900 omits fluoroscopy imaging means 811. Further, vessel imaging device 900 may omit GPU 804 in embodiments, in which vessel imaging device 900 only records vessel imaging sequence 110 and provides it to another entity, such as a fluoroscopy device 1000 or a general propose computing device 1100 via one of communications interface 805 and removable storage 806.

FIG. 10 shows fluoroscopy device 1000, which may be configured to perform real-time fluoroscopy 310. To this end, fluoroscopy device 1000 may include fluoroscopy imaging means 811 and may omit vessel imaging means 810 and contrast medium injection means 812. Fluoroscopy device 1000 may receive vessel roadmap library 200 from vessel imaging device 900 or general purpose computing device 1100 via communications interface 805 and/or removable storage 806. Fluoroscopy device 1000 may then use vessel roadmap library to implement vessel roadmap overlay 370, roadmap selection 371 and vessel roadmap alignment 380 via CPU 801 and/or GPU 804.

FIG. 11 shows general purpose computing device 1100, which may be configured to generate vessel roadmap library 200 based on vessel image sequence 110 received from vessel imaging device 900. Accordingly, general purpose computing device 1100 does not perform imaging itself and may thus omit vessel imaging means 810, fluoroscopy imaging means 811, contrast medium injection means 812 and ECG 813. General purpose computing device 1100 may thus implement, using CPU 801 and/or GPU 804, cardiac cycle detection 120, EDR detection 130, contrast detection 140, vessel segmentation 150 and contrast application object segmentation 160. To implement these processing entities, general purpose computing device 1100 may receive via one of communications interface 805 and removable storage 806, vessel image sequence 110.

The invention may further be illustrated by the following examples.

In an example, a computer-implemented dynamic vessel roadmapping method, comprises the steps of: generating a vessel roadmap library, the vessel roadmap library including a plurality of vessel roadmaps, wherein each vessel roadmap comprises vessel roadmap image and first and second alignment data; obtaining a real-time fluoroscopy image and corresponding real-time first and second fluoroscopy information; overlaying a vessel roadmap image of the vessel roadmap library with the real-time fluoroscopy image based on the first alignment data, the second alignment data, and the real time first and second fluoroscopy information; and aligning the vessel roadmap image and the real-time fluoroscopy image based on the second alignment data and the real time second fluoroscopy information, wherein the second alignment data is derived from the corresponding vessel roadmap image.

In an example, generating the vessel roadmap may include: obtaining a vessel image sequence using an imaging method based on an inflow of a contrast medium into a vessel tree via a contrast application object and imaging physiological information associated with the vessel image sequence; detecting, within the vessel image sequence, contrasted vessel images; performing vessel segmentation on the contrasted vessel images to generate vessel segmentation data; performing contrast application object segmentation on the contrasted vessel images to generate contrast application object segmentation data identifying a position of the contrast application object in the contrasted vessel images; and for each contrasted vessel image, generating a vessel roadmap, the generated vessel roadmap comprising: the contrasted vessel image and the vessel segmentation data as the vessel roadmap image; the imaging physiological information in the first alignment data; and the contrast application object segmentation data in the second alignment data.

In an example, generating the vessel roadmap may further include: the imaging physiological information may include an electrocardiogram -ECG-, the example may further comprise identifying one or more cardiac cycles within the vessel image sequence based on the ECG, and wherein the generated vessel roadmap may further comprise the identified one or more cardiac cycles in the first alignment data.

In an example, identifying the at least one cardiac cycle may include detecting a first R peak and a second R peak within the ECG.

In an example, detecting the first R peak and the second R peak may be based on a combined adaptive electrical activity threshold, the combined adaptive electrical activity threshold being the sum of a slew-rate threshold, an integration threshold and an expected beat threshold.

In an example, generating the vessel roadmap may further include obtaining, from the ECG, an ECG derived respiratory -EDR- signal, by comparing the one or more cardiac cycles and identifying fluctuations in the one or more cardiac cycles; and wherein the generated vessel roadmap may further comprise the EDR in the second alignment data.

In an example, detecting the contrasted vessel images may include identifying contrast pixels in the vessel image sequence indicating the contrast medium.

In an example, contrast pixels may be identified using a densely connected convolutional neural network with three pooling layers.

In an example, the method may further comprise identifying, based on the contrasted vessel images, one or more contrasted cardiac cycles among the one or more cardiac cycles; wherein generating the vessel roadmap may be performed for each contrasted vessel image one or more cardiac cycles.

In an example, identifying the one or more contrasted cardiac cycles may include: calculating, for each of the one or more cardiac cycles, a contrast ratio based on the contrasted vessel images, the contrast ratio being calculated based on identifying contrast pixels in the vessel image sequence divided by the number of pixels of the vessel images of the respective contrasted cardiac cycle.

In an example, the contrast application object may be a contrast application catheter and wherein the contrast application object segmentation data identify the position of one of a guidewire, a body or a tip of the catheter.

In an example, the contrast application object segmentation data may identify the position of a catheter tip; performing contrast application object segmentation may be performed using a densely connected convolutional neural network; and the contrast application object segmentation data may identify the catheter tip in the vessel image sequence.

In an example, the contrast application object segmentation data may identify the position of a catheter body; performing contrast application object segmentation may be performed using a deep learning architecture; and the contrast application object segmentation data may identify the catheter body in the vessel image sequence.

In an example, the imaging method may be angiography and the vessel tree may be a coronary artery.

In an example, obtaining a real-time fluoroscopy image and corresponding real-time first and second fluoroscopy information may include: obtaining fluoroscopy physiological information associated with the fluoroscopy image; and performing fluoroscopy object segmentation on the fluoroscopy image to generate fluoroscopy object segmentation data identifying a position of a fluoroscopy object in the fluoroscopy image, wherein the fluoroscopy physiological information is included in the first real-time fluoroscopy information, and wherein the generated fluoroscopy object segmentation data is included in the second real-time In an example, the fluoroscopy physiological information may include an electrocardiogram -ECG- and wherein obtaining the real-time fluoroscopy image and corresponding real-time first and second fluoroscopy information may further comprise identifying one or more cardiac cycles based on the ECG, wherein the identified one or more cardiac cycles may be included in the first real-time fluoroscopy information.

In an example, overlaying the vessel roadmap image of the vessel roadmap library with the real-time fluoroscopy image may include: selecting a vessel roadmap from the roadmap library based on comparing the first real-time fluoroscopy information with the first alignment data of each vessel roadmap of the roadmap library.

In an example, obtaining a real-time fluoroscopy image and corresponding real-time first and second fluoroscopy information may further include: obtaining, from the ECG, an ECG derived respiratory -EDR- signal, based on the identified one or more cardiac cycles; and wherein the EDR signal may be included in the second real-time fluoroscopy information.

In an example, selecting a vessel roadmap from the vessel roadmap library may further be based on comparing the second real-time fluoroscopy information with the second alignment data of each vessel roadmap of the roadmap library.

In an example, aligning the vessel roadmap image and the real-time fluoroscopy image based on the second alignment data and the real time second fluoroscopy information may include aligning the position of the contrast application object with the positon of the fluoroscopy object.

In an example, a computer-readable medium comprises instructions configured to be executed by a computer including at least one processor, the instructions causing the processor to perform the method according to any one of the preceding examples.

The preceding description has been provided to illustrate generating a vessel roadmap library and overlaying vessel roadmaps over fluoroscopy images. It should be understood that the description is in no way meant to limit the scope of the invention to the precise embodiments discussed throughout the description. Rather, the person skilled in the art will be aware that these embodiments may be combined, modified or condensed without departing from the scope of the invention as defined by the following claims.

The invention claimed is:

1. Computer-implemented dynamic vessel roadmapping method, comprising the steps of:
  generating a vessel roadmap library, the vessel roadmap library including a plurality of vessel roadmaps, wherein each vessel roadmap comprises a vessel roadmap image and first and second alignment data, wherein the first alignment data include an alignment electrocardiogram (ECG) and wherein the second alignment data include an alignment ECG derived respiratory (EDR) signal and contrast application object segmentation data;
  obtaining a real-time fluoroscopy image and corresponding real-time first and second fluoroscopy information, wherein the real-time first fluoroscopy information includes a fluoroscopy ECG and wherein the real-time second fluoroscopy information includes a fluoroscopy EDR signal and fluoroscopy object segmentation data;
  overlaying a vessel roadmap image of the vessel roadmap library with the real-time fluoroscopy image based on the first alignment data, the second alignment data, and the real time first and second fluoroscopy information, wherein overlaying the vessel roadmap image comprises selecting the vessel roadmap from the roadmap library based on comparing each alignment ECG of each vessel roadmap with the fluoroscopy ECG and based on comparing each alignment EDR signal of each vessel roadmap with each fluoroscopy EDR signal; and aligning the vessel roadmap image and the real-time fluoroscopy image based on the contrast application object segmentation data and the fluoroscopy object segmentation data,
wherein the second alignment data is derived from the corresponding vessel roadmap image.

2. The method of claim 1, wherein generating the vessel roadmap includes:
obtaining a vessel image sequence using an imaging method based on an inflow of a contrast medium into a vessel tree via a contrast application object and imaging physiological information associated with the vessel image sequence;
detecting, within the vessel image sequence, contrasted vessel images;
performing vessel segmentation on the contrasted vessel images to generate vessel segmentation data;
performing contrast application object segmentation on the contrasted vessel images to generate the contrast application object segmentation data identifying a position of the contrast application object in the contrasted vessel images; and
for each contrasted vessel image, generating a vessel roadmap, the generated vessel roadmap comprising:
the contrasted vessel image and the vessel segmentation data as the vessel roadmap image;
the imaging physiological information in the first alignment data; and
the contrast application object segmentation data in the second alignment data.

3. The method of claim 2, wherein generating the vessel roadmap further includes:
the imaging physiological information includes the alignment ECG,
the method further comprises identifying one or more cardiac cycles within the vessel image sequence based on the alignment ECG, and
wherein the generated vessel roadmap further comprises the identified one or more cardiac cycles in the first alignment data.

4. The method of claim 3, wherein identifying the one or more cardiac cycles includes detecting a first R peak and a second R peak within the alignment ECG.

5. The method of claim 4, wherein detecting the first R peak and the second R peak is based on a combined adaptive electrical activity threshold, the combined adaptive electrical activity threshold being a sum of a slew-rate threshold, an integration threshold and an expected beat threshold.

6. The method of claim 3, wherein generating the vessel roadmap further includes:
obtaining, from the alignment ECG, the alignment EDR signal, by comparing the one or more cardiac cycles and identifying fluctuations in the one or more cardiac cycles.

7. The method of claim 3, further comprising:
identifying, based on the contrasted vessel images, one or more contrasted cardiac cycles among the one or more cardiac cycles;
wherein generating the vessel roadmap is performed for each contrasted vessel image one or more cardiac cycles.

8. The method of claim 7, wherein identifying the one or more contrasted cardiac cycles includes:
calculating, for each of the one or more cardiac cycles, a contrast ratio based on the contrasted vessel images, the contrast ratio being calculated based on identifying contrast pixels in the vessel image sequence divided by a number of pixels of the vessel images of the respective contrasted cardiac cycle.

9. The method of claim 1, wherein obtaining a real-time fluoroscopy image and corresponding real-time first and second fluoroscopy information includes:
obtaining fluoroscopy physiological information associated with the fluoroscopy image; and
performing fluoroscopy object segmentation on the fluoroscopy image to generate the fluoroscopy object segmentation data identifying a position of a fluoroscopy object in the fluoroscopy image,
wherein the fluoroscopy physiological information is included in the first real-time fluoroscopy information, and
wherein the generated fluoroscopy object segmentation data is included in the second real-time fluoroscopy information.

10. The method of claim 9, wherein the fluoroscopy physiological information includes the fluoroscopy ECG and wherein obtaining the real-time fluoroscopy image and corresponding real-time first and second fluoroscopy information further comprises identifying one or more cardiac cycles based on the fluoroscopy ECG, wherein the identified one or more cardiac cycles are included in the first real-time fluoroscopy information.

11. The method of claim 10, wherein obtaining a real-time fluoroscopy image and corresponding real-time first and second fluoroscopy information further includes:
obtaining, from the fluoroscopy ECG, the fluoroscopy EDR signal, based on the identified one or more cardiac cycles.

12. The method of claim 9, wherein aligning the vessel roadmap image and the real-time fluoroscopy image based on the second alignment data and the real time second fluoroscopy information includes aligning the position of the contrast application object with a positon of the fluoroscopy object.

13. A non-transitory computer-readable medium comprising instructions configured to be executed by a computer including at least one processor, the instructions causing the processor to perform operations comprising:
generating a vessel roadmap library, the vessel roadmap library including a plurality of vessel roadmaps, wherein each vessel roadmap comprises a vessel roadmap image and first and second alignment data, wherein the first alignment data include an alignment electrocardiogram (ECG) and wherein the second alignment data include an alignment ECG derived respiratory (EDR) signal and contrast application object segmentation data;
obtaining a real-time fluoroscopy image and corresponding real-time first and second fluoroscopy information, wherein the real-time first fluoroscopy information includes a fluoroscopy ECG and wherein the real-time second fluoroscopy information includes a fluoroscopy EDR signal and fluoroscopy object segmentation data;
overlaying a vessel roadmap image of the vessel roadmap library with the real-time fluoroscopy image based on the first alignment data, the second alignment data, and the real time first and second fluoroscopy information, wherein overlaying the vessel roadmap image comprises selecting the vessel roadmap from the roadmap library based on comparing each alignment ECG of each vessel roadmap with the fluoroscopy ECG and based on comparing each alignment EDR signal of each vessel roadmap with each fluoroscopy EDR signal; and aligning the vessel roadmap image and the real-time fluoroscopy image based on the contrast application object segmentation data and the fluoroscopy object segmentation data,
wherein the second alignment data is derived from the corresponding vessel roadmap image.

14. The non-transitory computer-readable medium of claim 13, wherein generating the vessel roadmap includes:
obtaining a vessel image sequence using an imaging method based on an inflow of a contrast medium into a vessel tree via a contrast application object and imaging physiological information associated with the vessel image sequence;
detecting, within the vessel image sequence, contrasted vessel images;
performing vessel segmentation on the contrasted vessel images to generate vessel segmentation data;
performing contrast application object segmentation on the contrasted vessel images to generate the contrast application object segmentation data identifying a position of the contrast application object in the contrasted vessel images; and
for each contrasted vessel image, generating a vessel roadmap, the generated vessel roadmap comprising:
the contrasted vessel image and the vessel segmentation data as the vessel roadmap image;
the imaging physiological information in the first alignment data; and
the contrast application object segmentation data in the second alignment data.

15. The non-transitory computer-readable medium of claim 14, wherein generating the vessel roadmap further includes:
the imaging physiological information includes the alignment ECG,
the method further comprises identifying one or more cardiac cycles within the vessel image sequence based on the alignment ECG, and
wherein the generated vessel roadmap further comprises the identified one or more cardiac cycles in the first alignment data.

16. The non-transitory computer-readable medium of claim 15, wherein identifying the one or more cardiac cycles includes detecting a first R peak and a second R peak within the alignment ECG.

17. An apparatus comprising:
a memory storing computer program instructions; and
at least one processor configured to execute the computer program instructions, the computer program instructions configured to cause the at least one processor to perform operations of:
generating a vessel roadmap library, the vessel roadmap library including a plurality of vessel roadmaps, wherein each vessel roadmap comprises a vessel roadmap image and first and second alignment data, wherein the first alignment data include an alignment electrocardiogram (ECG) and wherein the second alignment data include an alignment ECG derived respiratory (EDR) signal and contrast application object segmentation data;
obtaining a real-time fluoroscopy image and corresponding real-time first and second fluoroscopy information, wherein the real-time first fluoroscopy information includes a fluoroscopy ECG and wherein the real-time second fluoroscopy information includes a fluoroscopy EDR signal and fluoroscopy object segmentation data;
overlaying a vessel roadmap image of the vessel roadmap library with the real-time fluoroscopy image based on the first alignment data, the second alignment data, and the real time first and second fluoroscopy information, wherein overlaying the vessel roadmap image comprises selecting the vessel roadmap from the roadmap library based on comparing each alignment ECG of each vessel roadmap with the fluoroscopy ECG and based on comparing each alignment EDR signal of each vessel roadmap with each fluoroscopy EDR signal; and
aligning the vessel roadmap image and the real-time fluoroscopy image based on the contrast application object segmentation data and the fluoroscopy object segmentation data,
wherein the second alignment data is derived from the corresponding vessel roadmap image.

18. The apparatus of claim 17, wherein obtaining a real-time fluoroscopy image and corresponding real-time first and second fluoroscopy information includes:
obtaining fluoroscopy physiological information associated with the fluoroscopy image; and
performing fluoroscopy object segmentation on the fluoroscopy image to generate the fluoroscopy object segmentation data identifying a position of a fluoroscopy object in the fluoroscopy image,
wherein the fluoroscopy physiological information is included in the first real-time fluoroscopy information, and
wherein the generated fluoroscopy object segmentation data is included in the second real-time fluoroscopy information.

19. The apparatus of claim 18, wherein the fluoroscopy physiological information includes the fluoroscopy ECG and wherein obtaining the real-time fluoroscopy image and corresponding real-time first and second fluoroscopy information further comprises identifying one or more cardiac cycles based on the fluoroscopy ECG, wherein the identified one or more cardiac cycles are included in the first real-time fluoroscopy information.

20. The apparatus of claim 19, wherein obtaining a real-time fluoroscopy image and corresponding real-time first and second fluoroscopy information further includes:
obtaining, from the fluoroscopy ECG, the fluoroscopy EDR signal, based on the identified one or more cardiac cycles.

* * * * *